United States Patent
Qu et al.

(10) Patent No.: US 11,478,805 B2
(45) Date of Patent: Oct. 25, 2022

(54) MINUTE FLUID JETTING DEVICE

(71) Applicant: CHANGZHOU MINGSEAL ROBOT TECHNOLOGY CO., LTD., Changzhou (CN)

(72) Inventors: Dongsheng Qu, Changzhou (CN); Jijiang Min, Changzhou (CN); Pei Sun, Changzhou (CN); Yangyang Mao, Changzhou (CN); Fuliang Gao, Changzhou (CN)

(73) Assignee: CHANGZHOU MINGSEAL ROBOT TECHNOLOGY CO., LTD., Changzhou (CN)

(*) Notice: Subject to any disclaimer, the term of this patent is extended or adjusted under 35 U.S.C. 154(b) by 411 days.

(21) Appl. No.: 16/612,037

(22) PCT Filed: Jan. 22, 2018

(86) PCT No.: PCT/CN2018/073593
§ 371 (c)(1),
(2) Date: Nov. 8, 2019

(87) PCT Pub. No.: WO2018/205681
PCT Pub. Date: Nov. 15, 2018

(65) Prior Publication Data
US 2021/0154688 A1    May 27, 2021

(30) Foreign Application Priority Data

May 8, 2017    (CN) .......................... 201710318650.4
May 8, 2017    (CN) .......................... 201720506058.2

(51) Int. Cl.
*B05B 1/30* (2006.01)
*B05B 1/10* (2006.01)

(52) U.S. Cl.
CPC .............. *B05B 1/3046* (2013.01); *B05B 1/10* (2013.01)

(58) Field of Classification Search
CPC ....... B05B 1/304; B05B 1/305; B05B 1/3046; F16K 31/004; F16K 31/006; F16K 31/007; F16K 31/008
See application file for complete search history.

(56) References Cited

U.S. PATENT DOCUMENTS 6,062,533 A  *  5/2000  Kappel ............. F02M 63/0026
                                              239/91
2016/0339471 A1* 11/2016  Bittner ................ B05C 11/1034

FOREIGN PATENT DOCUMENTS

CN    1847707    10/2006
CN   201127918   10/2008
(Continued)

OTHER PUBLICATIONS

English translation of the International Search Report from corresponding PCT Appln. No. PCT/CN2018/073593, dated Apr. 26, 2018.

(Continued)

*Primary Examiner* — Jason J Boeckmann
(74) *Attorney, Agent, or Firm* — Grossman, Tucker, Perreault & Pfleger, PLLC

(57) ABSTRACT

A fluid micro-injection device comprises an execution system (100) and a flow channel assembly (200) connected with the execution system (100). The execution system (100) includes a base body (110), a movable member (120), an executor, an adjusting member (130) and a plurality of clearance sheets. The flow channel assembly (200) have a fluid seat (210), a nozzle (220) and a fluid supply joint (230).

19 Claims, 11 Drawing Sheets

(56) References Cited

FOREIGN PATENT DOCUMENTS

| | | | | |
|---|---|---|---|---|
| CN | 201186252 | 1/2009 | | |
| CN | 201260998 | 6/2009 | | |
| CN | 101479465 | 7/2009 | | |
| CN | 201419145 | 3/2010 | | |
| CN | 202070458 | 12/2011 | | |
| CN | 204312818 | 5/2015 | | |
| CN | 104971840 | 10/2015 | | |
| CN | 205084915 | 3/2016 | | |
| CN | 106216126 | 12/2016 | | |
| CN | 107138300 | 9/2017 | | |
| CN | 206793956 | 12/2017 | | |
| DE | 202014103488 U1 | * 10/2014 | ........... | B05B 1/3046 |
| EP | 1625892 | 2/2006 | | |
| FR | 2863512 | 6/2005 | | |
| KR | 20150038889 | 4/2015 | | |
| KR | 101625337 | 5/2016 | | |

OTHER PUBLICATIONS

English translation of the Written Opinion of the International Searching Authority from corresponding PCT Appln. No. PCT/CN2018/073593, dated Apr. 26, 2018.
English translation of First Search Report from corresponding Chinese Appln. No. 201710318650.4 dated Mar. 31, 2019.
English translation of First Office Action from corresponding Chinese Appln. No. 201710318650.4, dated Apr. 10, 2019.
English translation of Second Office Action from corresponding Chinese Appln. No. 201710318650.4 dated Sep. 23, 2019.
Leixing, Precision of Transmission and Transformation Mechanism, dated Mar. 31, 2014, p. 257. English machine translation attached.

* cited by examiner

MINUTE FLUID JETTING DEVICE

FIELD

The present disclosure relates to an execution system for a fluid micro-injection device.

BACKGROUND

The existing fluid micro-injection device uses a flexible hinge mechanism or an operating element to perform a secondary movement of a closing element by a lever, thereby achieving micro-injection of fluid. Both ends of the closing element may be worn by the secondary movement so that replacement frequency and maintenance cost are increased accordingly. Further, lifting height of the closing element may not be adjusted or the adjustment precision thereof is low. Accordingly, the impact force required for fluid ejection is not adjustable or inaccurately adjusted, thus fluid ejection effect may not meet requirements. Furthermore, installation and disassembly of related mountings is cumbersome, resulting in low installation efficiency, inconvenient maintenance or replacement. In addition, the fluid flow channel of the existing fluid micro-injection device may have problems of closed flow channels, cumbersome cleaning, and complex assembly/disassembly of related accessories, resulting in low assembly efficiency, inconvenient assembly/disassembly or cleaning with high maintenance cost, and the assembly of the device may be time-consuming.

SUMMARY

The present disclosure aims to solve at least one of technical problems existing in the art.

To this end, the present disclosure may provide a fluid micro-injection device, which may be convenient for accuracy adjustment and easy for cleaning.

According to an embodiment of the present disclosure, a fluid micro-injection device may comprise an execution system, which may comprise a base body defining an executor mounting cavity therein, and the base body being provided with a positioning hole that communicates with the executor mounting cavity; a movable member movably disposed in the positioning hole; an executor movably disposed within the executor mounting cavity, the executor being connected to the movable member to control movement of the movable member; an adjusting member disposed in the executor mounting cavity and connected to the executor to adjust an operating position of the executor; and a plurality of clearance sheets disposed between an inner wall surface of the executor mounting cavity and the adjusting member to adjust a pre-tightening force of the executor; a flow channel assembly which is connected to the execution system, which may comprise: a fluid seat defining a fluid chamber on which the base body may be disposed and a flow channel in communication with the fluid chamber therein; a nozzle disposed on the fluid seat and in communication with the fluid chamber, a movable member movably passing through the fluid chamber to open and close the nozzle; and a fluid supply joint communicating with the flow channel to provide fluid to the nozzle through the flow channel and the fluid chamber. According to the fluid micro-injecting device according to the embodiment of the present disclosure, the number or thickness of the clearance sheets may be adjusted by providing the adjusting member and the plurality of clearance sheets, which cooperate with the executor. Therefore, a pre-tightening force of the executor may be adjusted, thus adjusting the fluid ejection effect of the fluid micro-injection device. The fluid chamber and the flow channel may be defined in the fluid seat, the nozzle on the fluid chamber may be opened and closed by the movable member, and the fluid supply joint may communicate with the fluid chamber through the flow channel. Thus, the flow channel assembly may have a simple structure, and be convenient for disassembly and assembly with low maintenance cost.

According to an embodiment of the present disclosure, the executor may comprise: a lever disposed in the executor mounting cavity, both ends of the lever may be movable, in which a first end of the lever may be connected to the movable member to control movement of the movable member; an actuator telescopically disposed within the executor mounting cavity, the actuator being connected to a second end of the lever to adjust an operating position of the actuator, the clearance sheets being disposed between the inner wall surface of the executor mounting cavity and the adjusting member to adjust a pre-tensioning force of the actuator; and a controller connected to the actuator to control extension and draw back of the actuator.

According to an embodiment of the present disclosure, the executor may further comprise a swing pin shaft disposed within the executor mounting cavity, an axis of the swing pin shaft being perpendicular to an axis of the actuator and offset from the axis of the actuator in a horizontal direction, and the second end of the lever may be connected to the swing pin shaft to pivot about the swing pin shaft.

According to an embodiment of the present disclosure, the swing pin shaft may be formed in a column shape, and the base body may be provided with a positioning groove adapted to mount the swing pin shaft. A lower surface at the second end of the level may be provided with a fitting concave surface that may fit with the swing pin shaft, and the swing pin shaft may be disposed between the positioning groove and the fitting concave surface.

According to an embodiment of the present disclosure, a cross section of the positioning groove may be formed in an arcuate shape and a radius of the positioning groove may be equal to that of the swing pin shaft. A cross section of the fitting concave surface may be formed in an arcuate shape and a radius of the fitting concave surface may be larger than that of the swing pin shaft.

According to an embodiment of the present disclosure, one end of the swing pin shaft may be provided with an end boss, and the end boss may abut against a bottom surface at the second end of the lever to limit a mounting height of the lever.

According to an embodiment of the present disclosure, the adjusting member may be provided at an upper end of the actuator, an upper actuator top block may be disposed between the adjusting member and the upper end of the actuator, a lower actuator top block may be disposed between a lower end of the actuator and the second end of the lever, and the lower actuator top block may abut against the lower end of the actuator and the second end of the lever.

According to an embodiment of the present disclosure, a lower surface of the adjusting member may be formed as an upwardly concave curved surface, an upper surface of the upper actuator top block may be formed as an upwardly projecting curved surface, and a radius of the upper surface of the upper actuator top block may be smaller than that of the lower surface of the adjustment element.

According to an embodiment of the present disclosure, an upper surface of the second end of the lever may be provided with a first protrusion, a cross section of which may be formed into an arcuate shape, and a lower surface of the lower actuator top block may be provided with a notch, a cross section of which may be formed in an arcuate shape, and a radius of the first projection may be smaller than that of the notch.

According to an embodiment of the present disclosure, a lower surface of the first end of the lever may be provided with a second protrusion, a cross section of which may be formed with an arcuate shape and the second protrusion may abut against an upper end surface of the movable member.

According to an embodiment of the present disclosure, the execution system may further comprise a guiding seat disposed in the positioning hole. The guiding seat may be provided with a guiding hole penetrating through in an axial direction thereof, and the movable member is movably disposed on the guiding seat along the axial direction of the guiding hole.

According to an embodiment of the present disclosure, the movable member may comprise: a cylindrical shaft movably disposed in the guiding hole along an axial direction thereof, and a lower end of the cylindrical shaft being formed as a ball head; and an upper end part disposed at an upper end of the cylindrical shaft, the upper end part having a size larger than a radius of the cylindrical shaft, and a first elastic element being disposed between the upper end part and the guiding seat.

According to an embodiment of the present disclosure, the guiding seat may comprise: a positioning boss detachably disposed in the positioning hole; and an upper convex cylinder disposed at an upper portion of the positioning boss and disposed coaxially with the positioning boss. A radial dimension of the upper convex cylinder may be smaller than that of the positioning boss, the guiding hole may penetrate through the upper convex cylinder and the positioning boss, and the first elastic element may be formed as a spring that may sleeve upon the upper convex cylinder with both ends abutting against the positioning boss and the upper end part respectively.

According to an embodiment of the present disclosure, one end of the positioning hole communicating with the executor mounting cavity may be provided with a positioning recess having a radial dimension larger than that of the positioning hole. And the execution system may further comprise a positioning seat disposed in the positioning recess, the guiding seat extending through the positioning seat in the axial direction, and a second elastic element disposed between the positioning seat and the first end of the lever.

According to an embodiment of the present disclosure, the second elastic element may be formed as a spring with both ends of the second elastic element abutting against an upper surface of the positioning seat and a lower surface of the first end of the lever respectively.

According to an embodiment of the present disclosure, an outer contour of the positioning seat may be formed substantially in a square shape, an outer circumference of the upper surface of the positioning seat may be provided with a plurality of projecting portions circumferentially spaced apart, and inner surfaces of each of the projecting portions may be respectively formed as arcuate faces corresponding to the outer contour shape of the second elastic element.

According to an embodiment of the present disclosure, the flow channel assembly may further comprise: an adapter defining a flow guiding passage therein. And the adapter may be connected to the fluid seat and the flow guiding passage may be in communication with the flow channel, the fluid supply joint may be disposed on the adapter and communicate with the flow guiding passage.

According to an embodiment of the present disclosure, seal rings may be disposed between the adapter and the fluid supply joint and between the adapter and the fluid seat respectively.

According to an embodiment of the present disclosure, the adapter and the fluid seat may be connected by a screw.

According to an embodiment of the present disclosure, the fluid seat may be provided with a first assembly ramp extending slantedly with respect to a horizontal direction, and the adapter may be provided with a second assembly ramp that may fit with the first assembly ramp, the screw may pass through the adapter and the fluid seat to compress the first assembly ramp and the second assembly ramp.

According to an embodiment of the present disclosure, the first assembly ramp may be provided with a positioning recess, and the second assembly ramp may be provided with a positioning boss corresponding to the positioning recess, the positioning boss may be inserted into the positioning recess.

According to an embodiment of the present disclosure, an opening of the positioning recess may be formed with an acute angle and a bottom surface of the positioning recess may extend in the horizontal direction.

According to an embodiment of the present disclosure, the flow channel extends slantedly with respect to a horizontal direction, the flow guiding passage may extend with respect to a vertical direction, a lower end of the flow channel may communicate with the fluid chamber, and an upper end of the flow channel may communicate with a lower end of the flow guiding passage.

According to an embodiment of the present disclosure, the flow channel assembly may further comprise a fluid chamber seal disposed in the fluid chamber and located at an upper end of the fluid chamber to close the upper end of the fluid chamber, the fluid chamber seal being provided with an inner hole extending therethrough in an axial direction thereof, and the movable member extending through the inner hole into the fluid chamber.

According to an embodiment of the present disclosure, the upper end of the fluid chamber may be formed in a stepped shape, and the fluid chamber seal may comprise: an outer cylinder having a shape corresponding to a shape of the upper end of the fluid chamber to be fitted at the upper end of the fluid chamber; and an inner cylinder having a radial dimension smaller than that of the outer cylinder, the inner cylinder being disposed in the outer cylinder and elastically connected to the outer cylinder, the inner cylinder being provided with the inner hole therein that may penetrate it in an axial direction thereof.

According to an embodiment of the present disclosure, the inner cylinder and the outer cylinder may be connected by a bending elbow member.

According to an embodiment of the present disclosure, the flow channel assembly may further comprise a sealing seat disposed on the fluid seat between the fluid chamber seal and the nozzle, the sealing seat being provided with a guiding passage penetrating in an axial direction thereof, the nozzle and the sealing seat may be connected and in communication with the guide passage, and the movable member may pass through the guide passage and be movable along the axial direction of the guide passage to open and close the nozzle.

According to an embodiment of the present disclosure, a cross section of the guiding passage may be formed with a flower-shaped cross section.

According to an embodiment of the present disclosure, a bottom of the sealing seat may be provided with a positioning step, the nozzle may be provided with a positioning protrusion corresponding to the positioning step, and the positioning protrusion may be embedded in the positioning step.

According to an embodiment of the present disclosure, the nozzle may define an injection passage therein that may penetrate along an up-down direction, and an upper end of the injection passage may be formed with a tapered surface fitting with a lower end surface of the movable member.

According to an embodiment of the present disclosure, a lower end of the injection passage may be provided with micro-holes.

According to an embodiment of the present disclosure, a lower end of the nozzle may be provided with a tapered boss, and the micro-holes may be provided in the tapered boss.

According to an embodiment of the present disclosure, the flow channel assembly may further comprise a threaded sleeve, the nozzle and the sealing seat may be mounted on the fluid seat by the threaded sleeve. The additional aspects and advantages of the present disclosure will be set forth and apparent in part in the following description or be learned by practicing the present disclosure.

BRIEF DESCRIPTION OF THE DRAWINGS

The above and/or additional aspects and advantages of the present disclosure will become apparent and readily understood from the following attached drawings, wherein.

DRAWING REFERENCE SIGNS

Figure 1:
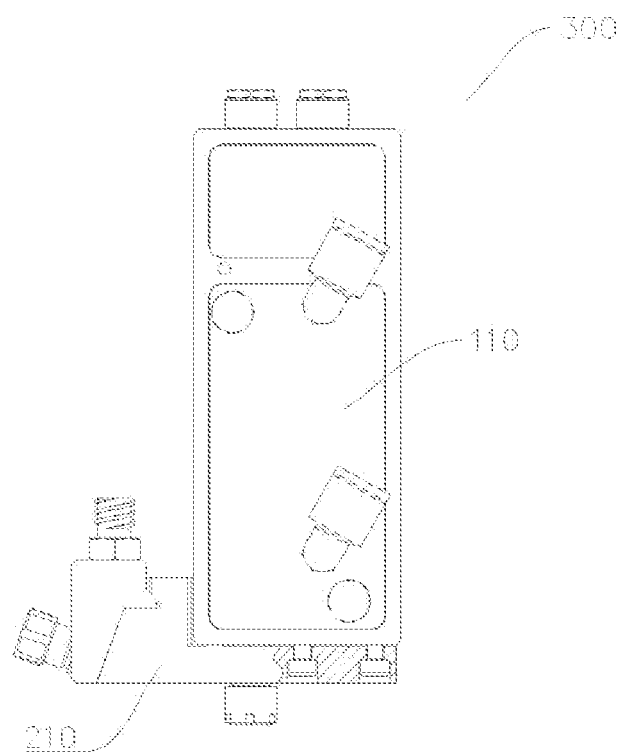
FIG. 1 is a schematic view showing a structure of a fluid micro-injection device according to an embodiment of the present disclosure.

Fluid micro-injection device 300;
Execution system 100;
Base body 110; Executor mounting cavity 111; Positioning hole 112; Positioning recess 1121; Positioning groove 113; Controller mounting cavity 114;
Movable member 120; Cylindrical shaft 121; Ball head 122; Upper end part 123;

Adjusting member 130;
Lever 141; Fitting concave surface 1411; First protrusion 1412; Second protrusion 1413;
Actuator 142; Controller 143; Upper actuator top block 144; Lower actuator top block 145; Notch 1451; Swing pin shaft 146; End boss 1461;
Guiding seat 150; Guiding hole 151; Positioning boss 152; Mounting notch 1521; Upper convex cylinder 153;
First elastic element 160;
Positioning seat 170; Protruding portion 171;
Second elastic element 180;
Flow channel assembly 200;
Fluid seat 210; Fluid chamber 211; Flow channel 212; First assembly ramp 213; Positioning recess 214;
Nozzle 220; Positioning protrusion 221; Injection channel 222; Tapered boss 223;
Fluid chamber supply joint 230;
Adapter 240; Flow guiding channel 241; Second assembly ramp 242; Positioning boss 243; U-shaped opening 244;
Fluid chamber seal 250; Inner hole 251; Outer cylinder 252; Inner cylinder 253; Bending elbow member 254;
Sealing seat 260; Guiding passage 261; Positioning step 262;
Threaded sleeve 270; Internal thread 271; Inner mounting plane 272; flower-shaped notches 273;
Sealing ring 280; Screw 281;
Displacement sensor 310; Controller 320; Temperature sensor 330; clearance sheet 115;
Cover plate 340; Mounting counterbore 341; Guard groove 342; micro-hole 224;
First joint 350; Second joint 360; Protective gasket 370.

DETAILED DESCRIPTION

Embodiments of the present disclosure will be described hereinafter in detail. Examples of the embodiments are illustrated in the drawings, wherein the same or similar reference numerals refer to the same or similar elements or elements having the same or similar functions. The embodiments described below with reference to the accompanying drawings are illustrative to explain the present disclosure and should not be construed as being limited to the present disclosure.

In the description of the present disclosure, it should be understood that terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like refer to orientation and positional relationship based on the orientation or positional relationship shown in the drawings. Those merely intend to describe the present disclosure and simplify description, and do not indicate or imply that the indicated devices or components must be constructed and operated in a particular orientation. Therefore, the above cannot be construed as being limited to the present disclosure. Furthermore, features defining "first" and "second" may explicitly or implicitly include one or more features. In the description of the present disclosure, "plurality" means two or more, unless otherwise stated.

In the description of the present disclosure, it should be noted that the terms "installation", "attached", and "connected" should be understood widely, and for example, the terms may refer to be fixedly or detachable or integrally connected; mechanical or electrical connection; directly connected, or indirectly connected through an intermediate medium, or internal communication of two components, unless otherwise explicitly stated and defined. The specific meaning of the above terms in the present disclosure can be understood in a specific case by those skilled in the art.

According to an embodiment of the present disclosure, a fluid micro-injection device 300 may be specifically described below with reference to FIGS. 1-28.

Firstly, as shown in FIG. 1, the fluid micro-injection device 300 according to an embodiment of the present disclosure may include an execution system 100 and a flow channel assembly 200. As shown in FIGS. 2-11, the execution system 100 may include a base body 110, a movable member 120, an executor, an adjusting member 130 and a plurality of clearance sheets 115. As shown in FIGS. 12-23, the flow channel assembly 200 may include a fluid seat 210, a nozzle 220, and a fluid chamber supply joint 230.

Specifically, the base body 110 may include an executor mounting cavity 111 defined therein. The base body 110 may be provided with a positioning hole 112 that may be communicated with the executor mounting cavity 111. The movable member 120 is movably disposed in the positioning hole 112. The executor may be movably disposed in the executor mounting cavity 111. The executor may be connected with the movable member 120 to control movement of the movable member 120. The adjusting member 130 may be disposed in the executor mounting cavity 111 and connected with the executor to adjust the working position of the executor. The plurality of clearance sheets 115 may be disposed between an inner wall surface of the executor mounting cavity 111 and the adjusting member 130 so as to adjust a pre-tightening force of the executor.

The fluid seat 210 may defines a fluid chamber 211 and a flow channel 212 communicating with the fluid chamber 211. The nozzle 220 may be disposed on the fluid seat 210 and communicate with the fluid chamber 211. A movable member may movably pass through the fluid chamber 211 to open and close the nozzle 220. The fluid chamber supply joint 230 may communicate with the flow channel 212 to supply fluid to the nozzle 220 through the flow channel 212 and the fluid chamber 211.

The base body 110 of the execution system 100 may be connected with the fluid seat 210 of the flow channel assembly 200 by bolts. Alternatively, the base body and the fluid seat may be connected by a rotary snap connection, i.e., the stepped fluid chamber 211 of the fluid seat 210 in the flow channel assembly 200 may firstly fit with a positioning boss 152 of the guiding seat 150 in the execution system 100. The flow channel assembly 200 may then be rotated along an axis of the positioning boss 152 to rotate the flow channel assembly 200 into a valve body bayonet and be positioned by positioning ball screws.

In view of the above, the fluid micro-injection device 300 according to an embodiment of the present disclosure may adjust the number or thickness of the clearance sheets 115 by providing the adjusting element 130 and the plurality of clearance sheets. Therefore, a pre-tightening force of the executor may be adjusted, thus adjusting fluid ejection effect of the fluid micro-injection device. By defining the fluid chamber 211 and the flow channel 212 in the fluid seat 210, the nozzle 220 on the fluid chamber 211 may be opened and closed by the movable element 120. The fluid supply joint 230 may communicate with the fluid chamber 211 through the flow channel 212. Therefore, the flow channel assembly may have a simple structure, be convenient for disassembly and assembly with low maintenance cost.

According to the embodiment of the present disclosure, the execution system 100 for the fluid micro-injection device 300 will be specifically described below with reference to FIGS. 2-11.

Figure 3:
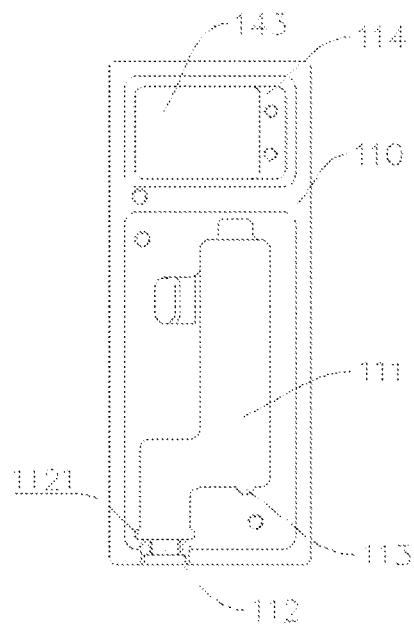
FIG. 3 is a schematic view showing a structure of a base body of the execution system for the fluid micro-injection device according to an embodiment of the present disclosure.

As shown in FIG. 3, the base body 110 may be provided with the executor mounting cavity 111 and the positioning hole 112. The executor may be mounted in the executor mounting cavity 111. The movable member 120 may be disposed in the positioning hole 112 and cooperate with the executor to be operated by the executor. The adjusting member 130 may be also disposed in the executor mounting cavity 111 and connected to at least a portion of the executor to adjust the working position of the executor. A plurality of clearance sheets 115 may be provided between the adjusting member 130 and the inner wall surface of the executor mounting cavity 111. The number or thickness of the clearance sheets 115 may be adjusted so that the executor can be squeezed to different degrees. Accordingly, the executor 10 may be brought to an improved initial motion state, to achieve the purpose of adjusting the fluid ejection effect of the injection system 100.

According to an embodiment of the present disclosure, the executor may include a lever 141, an actuator 142, and a controller 143.

Specifically, the lever 141 may be disposed in the executor mounting cavity 111 and both ends of the lever 141 may be movable. A first end of the lever 141 may be connected to the movable member 120 to control movement of the movable member 120. The actuator 142 may be telescopically disposed in the executor mounting cavity 111. The actuator 142 may be connected to a second end of the lever 141 to control the movement of the lever 141. The adjusting member 130 may be connected to the actuator 142 to adjust an actuating position of the actuator. The clearance sheets 115 may be mounted between the inner wall surface of the executor mounting cavity 111 and the adjusting member 130 to adjust the pre-tightening force of the actuator 142. The controller 143 may be connected to the actuator 142 to control extension and draw back of the actuator 142.

Figure 2:
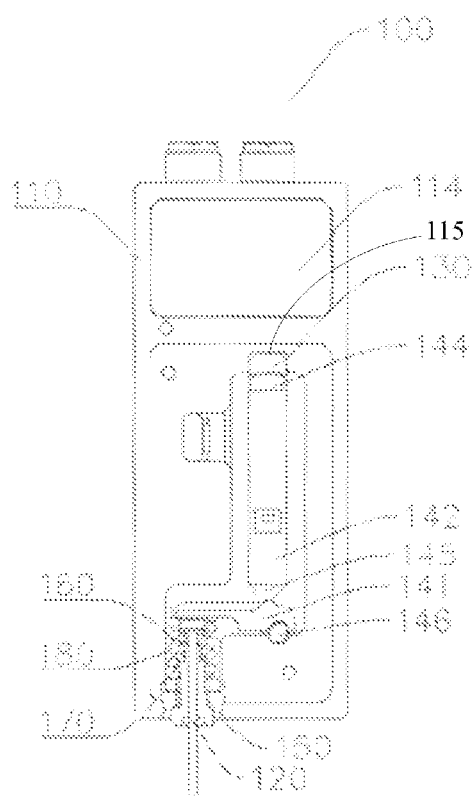
FIG. 2 is a schematic view showing a structure of the execution system for the fluid micro-injection device according to an embodiment of the present disclosure.

As shown in FIG. 2, the left end shown in the figure may be the first end of the lever 141, and the right end of the figure may be the second end of the lever 141. The lever 141 may be rotatable about an axis in a horizontal direction. The left end of the lever 141 may be connected to an upper end of the movable member 120 so as to drive the movable member 120 to move in an up-down direction when the lever 141 may move in the up-down direction. The actuator 142 may be provided at the right end of the lever 141 and may be telescopic in the up-down direction. The lower end of the actuator 142 may be connected to the right end of the lever 141. The actuator 142 may extend and draw back in the up-down direction to press or release the right end of the lever 141. The adjusting member 130 may be connected with the upper end of the actuator 142. A downward force pressing the actuator 142 may be adjusted by adjusting the number or thickness of the clearance sheets 115 between the inner wall surface of the executor mounting cavity 111 and the adjusting member 130. Thereby, a downward force of the actuator 142 pressing the right end of the lever 141 may be adjusted so that the actuator 142 may obtain an improved initial moving state. The displacement of the executor may be achieved by different displacements of the actuator 142 at different voltages. In addition, a controller mounting cavity 114 for mounting the controller 143 may be disposed within the base body 110.

According to the execution system 100 of the embodiment of the present disclosure as described hereinabove, the lever 141, the actuator 142 and the adjusting member 130 may cooperate to conveniently adjust displacement of the movable member 120, thus adjusting the fluid ejection effect of the fluid micro-injection device. Further, the structure may be simple, with convenient operation. And the moving displacement of the movable member 120 may be more precisely adjusted by controlling the thickness of the clearance sheets 115.

According to an embodiment of the present disclosure, the executor may further include a swing pin shaft 146 disposed in the executor mounting cavity 111. An axis of the swing pin shaft 146 may be perpendicular to the axis of the actuator 142 and both may be staggered in the horizontal direction. The second end of the lever 141 may be connected to the swing pin shaft 146 to pivot about the swing pin shaft 146.

Further, the swing pin shaft 146 may be formed into a column shape. The base body 110 may be provided with a positioning groove 113 adapted to mount the swing pin shaft 146. A lower surface of the second end of the lever 141 may be provided with a fitting concave surface 1411 to be fitted with the swing pin shaft 146. The swing pin shaft 146 may be disposed between the positioning groove 113 and the fitting concave surface 1411.

Specifically, the base body 110 may be provided with the positioning groove 113, as shown in FIGS. 2 and 3. The positioning groove 113 may be provided with the swing pin shaft 146 therein. The lower surface of the right end of the lever 141 may be provided with the fitting concave surface 1411, which may fit with the swing pin shaft 146. The lever 141 may be pivotally disposed within the executor mounting cavity 111 about the axis of the swing pin shaft 146. It should be noted that the axis of the actuator 142 may be offset from the axis of the swing pin shaft 146 in the horizontal direction. A contact point of the actuator 142 with the lever 141 may be located at the left side of the swing pin shaft 146. That is to say, a contact point of the lever 141 with the movable member 120 and the contact point of the lever 141 with the actuator 142 may be located on the same side of the swing pin shaft 146. Accordingly, the moving displacement of the right end of the lever 141 caused by a force applied to the right end of the lever 141 by the actuator 142 may be magnified at the left end of the lever 141 when the actuator 142 may extend or draw back. Thus, the displacement of the movable member 120 may be conveniently adjusted with accuracy by a small displacement adjustment at the right end of the level 141.

In some embodiments of the present disclosure, a cross section of the positioning groove 113 may be formed into an arcuate shape and the radius of the positioning groove 113 may be equal to that of the swing pin shaft 146. Therefore, the swing pin shaft 146 may be positioned and immobile in the positioning groove 113. A cross section of the fitting concave surface 1411 may be formed into an arcuate shape and the radius of the fitting concave surface 1411 may be larger than the radius of the swing pin shaft 146. This may facilitate formation of the rotational line contact, reduce influence of the frictional force, and ensure displacement and force transmission of the actuator 142.

Figure 4:
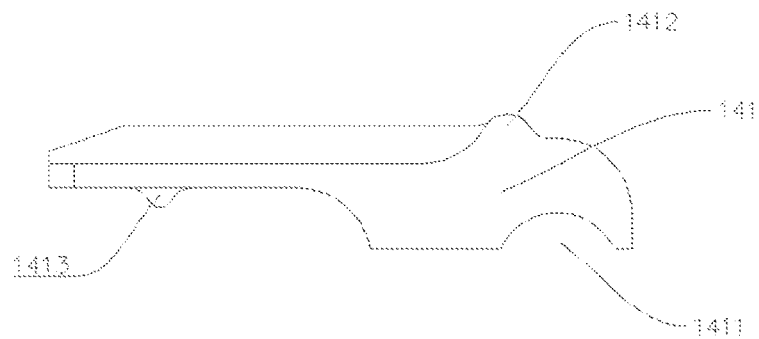
FIG. 4 is a schematic view showing a structure of a lever of the execution system for the fluid micro-injection device according to an embodiment of the present disclosure.
Figure 5:
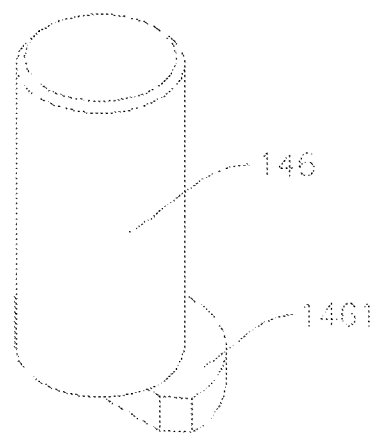
FIG. 5 is a schematic view showing a structure of a swing pin shaft of the execution system for the fluid micro-injection device according to an embodiment of the present disclosure.

According to an embodiment of the present disclosure, one end of the swing pin shaft 146 may be provided with an end boss 1461 that may abut against a bottom surface of the second end of the lever 141 to limit a mounting height of the lever 141. Specifically, as shown in FIG. 4, one end of the swing pin shaft 146 may be provided with a semi-circular end boss 1461, which may abut against a bottom surface of the right end of the lever 141 and limit the mounting height of the lever 141 to facilitate assembly accordingly.

As shown in FIG. 2, in some embodiments of the present disclosure, the adjusting member 130 may be disposed at the upper end of the actuator 142 and an upper actuator top block 144 may be disposed between the adjusting member 130 and the upper end of the actuator 142. A lower actuator top block 145 may be disposed between the lower end of the actuator 142 and the second end of the lever 141. The lower actuator top block 145 may abut against the lower end of the actuator 142 and the second end of the lever 141.

That is, the upper and lower ends of the actuator 142 may be respectively provided with a top block structure to prevent the actuator 142 from directly contacting with the lever 141 or the base body 110, wherein the upper end of the actuator 142 may be provided with the upper actuator top block 144 and the lower end of the actuator 142 may be provided with the lower actuator top block 145. The actuator 142 may be abutted against the adjusting member 130 by the upper actuator top block 144, and may be abutted against the lever 141 by the lower actuator top block 145.

According to an embodiment of the present disclosure, the lower surface of the adjusting member 130 may be formed as a curved or arc-shaped surface, which may be concaved upwardly. The upper surface of the upper actuator top block 144 may be formed as a curved or arc-shaped surface, which projects upwardly. A radius of the upper surface of the upper actuator top block 144 may be smaller than that of the lower surface of the adjusting member 130.

As shown in FIG. 2, surfaces of the adjusting member 130 fitting with the upper actuator top block 144 may be respectively formed as curved faces, thereby defining a lateral displacement of the actuator 142. A convex face radius of the upper surface of the upper actuator top block 144 may be smaller than a concave face radius of the adjusting member 130, thus forming a point contact to facilitate automatic adjustment of the position of the actuator 142.

Alternatively, according to some embodiments of the present disclosure, the upper surface of the second end of the lever 141 may be provided with a first protrusion 1412, of which a cross section may be formed in an arcuate shape. The lower surface of the lower actuator top block 145 may be provided with a notch 1451, of which a cross section may be formed in an arcuate shape. A radius of the first protrusion 1412 may be smaller than that of the notch 1451.

Further, the lower surface of the first end of the lever 141 may be provided with a second protrusion 1413. a cross section of the second protrusion 1413 may be formed in an arcuate shape and abut against an upper end surface of the movable member 120.

Specifically, the upper surface of the right end of the lever 141 may be provided with the first protrusion 1412, and the lower surface of the lower actuator top block 145 may be provided with a notch 1451 that has a concave face radius larger than the convex face radius of the protrusion, as shown in FIGS. 2 and 4. This may facilitate formation of line contact, reducing influence of the friction force, and ensuring displacement and force transmission of the actuator 142. The lower surface of the left end of the lever 141 may be provided with the second protrusion 1413 that may abut against the upper end surface of the movable member 120. The arcuate-shaped convex structure may facilitate formation of line contact and reduce influence of the friction force.

Inter alia, the lever 141 may have a high rigidity to ensure that the contacting surfaces may not deform after long-term usage, which may otherwise affect displacement or force transmission.

According to an embodiment of the present disclosure, the execution system 100 of the fluid micro-injection device may further comprise a guiding seat 150. The guiding seat 150 may be disposed in the positioning hole 112. The guiding seat 150 may be provided with a guiding hole 151 extending therethrough along an axial direction thereof. The movable member 120 may be movably disposed in the guiding seat 150 in the axial direction of the guiding hole 151. Accordingly, a moving trajectory of the movable member 120 may be ensured and an operational stability of the movable member may be improved accordingly.

Figure 6:
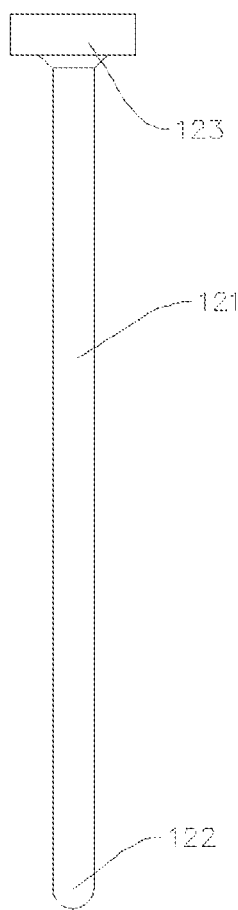
FIG. 6 is a schematic view showing a structure of a movable member of the execution system for the fluid micro-injection device according to an embodiment of the present disclosure.

Alternatively, the movable member 120 may comprise a cylindrical shaft 121 and an upper end part 123, as shown in FIG. 6. The cylindrical shaft 121 may be movably disposed in the guiding hole 151 in the axial direction thereof. The lower end of the cylindrical shaft 121 may be formed as a ball head 122. The upper end part 123 may be disposed at an upper end of the cylindrical shaft 121. The upper end part 123 may have a size larger than a radius of the cylindrical shaft 121. A first elastic element 160 may be disposed between the upper end part 123 and the guiding seat 150.

The cylindrical shaft 121 may be perpendicular to the upper end part 123 and fit with the guiding hole 151, so that the movable member 120 may move in the up-down direction along the guiding hole 151. The ball head 122 may be coaxial with the nozzle of the flow channel assembly and in close contact therewith, so that the fluid may be sealed in the flow channel assembly.

Thus, by the first elastic element 160 provided between the movable member 120 and the guiding seat 150, the movable member 120 may be restored to the original position under a restoring force of the first elastic element 160 after the force releasing of the lever 141 to the movable member 120. Therefore, switching and adjustment of the flow channel assembly may be realized, which may be convenient to use and operate.

In some embodiments of the present disclosure, the guiding seat 150 may comprise a positioning boss 152 and an upper convex cylinder 153. The positioning boss 152 may be detachably, like threadedly etc., disposed in the positioning hole 112. After the tightening of the positioning boss 152 with the positioning hole 112 of the base body 110. A bottom surface of the positioning boss 152 may be flush with the bottom surface of the base body 110, and the axis of the guiding seat 150 may be coaxial with the positioning hole 112 and perpendicular to the bottom surface of the base body 110.

The upper convex cylinder 153 may be disposed on an upper portion of the positioning boss 152 and disposed coaxially with the positioning boss 152. A radial dimension of the upper convex cylinder 153 may be smaller than that of the positioning boss 142. The guiding hole 151 may penetrate through the upper convex cylinder 153 and the positioning boss 152. The first elastic element 160 may be formed as a spring which may be fitted over the upper convex cylinder 153 with both ends thereof being abut against the positioning boss 152 and the upper end part 123 respectively. Therefore, the guiding seat 150 may fit with the spring to ensure stable spring assembly. Meanwhile, the upper end part 123 may transmit an opposing force of the first elastic element 60 to the base body 110 to ensure a stable force of the first elastic element 60 accordingly.

In addition, a mounting notch 1521 may be disposed on the positioning boss 152 to facilitate in-line engagement of the positioning boss 152, thus facilitating mounting and dismounting of the guiding seat 150 and the base body 110.

According to an embodiment of the present disclosure, one end of the positioning hole 112 communicating with the executor mounting cavity 111 may be provided with a positioning recess 1121, which may have a radius larger than that of the positioning hole 112. The execution system 100 may further comprise a positioning seat 170 and a second elastic element 180.

Specifically, the positioning seat 170 may be disposed in the positioning groove 1121. The guiding seat 150 may extend through the positioning seat 170 in the axial direction. The second elastic element 180 may be disposed between the positioning seat 170 and the first end of the lever 141. Alternatively, the second elastic element 180 may be formed as a spring, and both ends of the second elastic element 180 may abut against the upper surface of the positioning seat 170 and the lower surface of the first end of the lever 141 respectively.

That is, the positioning seat 170 may be further disposed in the positioning hole 112. The positioning seat 170 may be fixed in the positioning groove 1121 of the positioning seat 112. The second elastic element 180 may be disposed between the positioning seat 170 and the left end of the lever 141. The second elastic element 180 may be a spring fitted over the first elastic element 160.

The upper end surface of the second elastic element 180 may be perpendicular to the axis of the second elastic element 180 and may be in close contact with bottom of the left end of the lever 141 to facilitate transmission of a force acting on the lever 141 so that the lever 141 may reach the corresponding position in time. The lower end surface of the second elastic element 180 may be perpendicular to the axis of the second elastic element 180 and may be in close contact with the positioning seat 170, so that a reverse force may be transmitted to the base body 110 through the positioning seat 170 to ensure force stability. The second elastic element 180 may have an outer diameter that may be fit with that of a counterbore of the positioning seat 170 to ensure that the stable positioning of the second elastic element 180.

Figure 11:
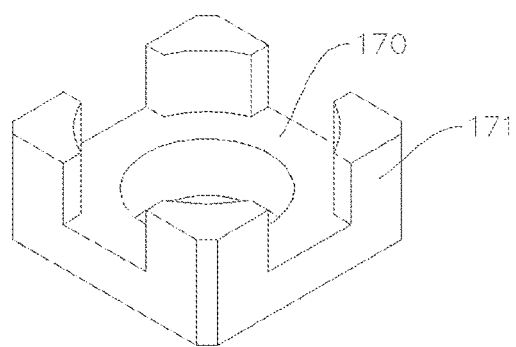
FIG. 11 is a schematic view showing a structure of a positioning seat of the execution system for a fluid micro-injection device according to an embodiment of the present disclosure.

According to an embodiment of the present disclosure, an outer contour of the positioning seat 170 may be formed substantially in a square shape, as shown in FIG. 11. The outer circumference of the upper surface of the positioning seat 170 may be provided with a plurality of projecting portions 171 in interval. The inner surface of each projecting portions 171 may be respectively formed as arcuate face corresponding to that of the outer contour of the second elastic element 180. The inner surface of the projecting portion 171 may be formed into an arcuate face, which may fit with the outer diameter of the second elastic element 180 to ensure the stable positioning thereof. The structure of the projecting portion 171 may limit the position of the second elastic element 180 to improve structural stability accordingly.

The assembly process and feature of the execution system 100 for the fluid micro-injection device according to an embodiment of the present disclosure may be specifically described below.

Firstly, the positioning seat 170 and the second elastic element 180 may be assembled and then mounted into the positioning recess 1121 of the base body 110. The bottom surface of the positioning seat 170 may abut against the bottom surface of the positioning recess 1121. The swing pin shaft 146 may then be mounted into the positioning groove 113, and an end boss 1461 of the swing pin shaft 146 may point downwardly. Next, the lever 141 may be mounted and the fitting concave surface 1411 of the lever 141 may be fitted with the swing pin shaft 146. The left end of the level may abut against the upper end surface of the second elastic element 180, and the lower surface of the level may abut against the boss face of the end boss 1461.

Then, the adjusting member 130, the upper actuator top block 144, the actuator 142 and the lower actuator top block 145 may be then sequentially mounted into the base body 110. A side surface of the adjusting member 130 may be fitted with a side surface of the base body 110. The notch 1451 of the lower actuator top block 145 may fit with the first protrusion 1412 at the right end of the lever 141. The movable member 120, the first elastic element 160 and the guiding seat 150 may be assembled together and screwed into the positioning hole 112 via threads on the guiding seat 150. Thus, the execution system 100 for the fluid micro-injection device may be assembled with parts being closely fitted with each other. Except the swinging degree freedom, all other degrees of freedom are limited.

The assembly features of the various components of the execution system 100 for the fluid micro-injection device may be described as follows.

The actuator 142, the upper actuator top block 144 and the lower actuator top block 145 may need to be tightly assembled, therefore, bonding may be an option. A gauge block may be used to calibrate positions of these three elements during bonding, thus ensuring the center of the upper actuator top block 144 being located on the axis of the piezoelectric actuator 142. The concave face axis of the notch 1451 of the lower actuator top block 145 may intersect with and be perpendicular to the axis of the piezoelectric actuator 142.

The lever 141 may be moved downwardly by an assembly tool during assembly to compress the second elastic element 180. Thus, the position of the convex surface at the right end of the lever 141 may be lowered to help the mounting of the upper actuator top block 144 and the piezoelectric actuator 142 of the lower actuator top block 145 bonded together. Before assembling into the piezoelectric actuator 142, the adjusting member 130 may be mounted into an adjusting recess of the base body 110 of the execution system 100, and the arcuate convex surface of the upper actuator top block 144 may then be fitted into the arcuate concave surface of the adjusting member 130. Then the notch 1451 of the lower actuator top block 145 may be assembled with the first protrusion 1412 of the lever 141.

The clearance sheets 115 with a certain thickness may be provided between the plane of the adjusting member 130 and an upper plane of the adjusting recess of the base body 110. Accordingly, a reversing force of the second elastic element 180 acting on the left end of the lever 141 may be kept balance with a force of the piezoelectric actuator 142 acting on the right end of the lever 141. A pre-tightening force may be applied to the piezoelectric actuator 142 and the lever 141 at this time may be brought to a horizontal state.

The first elastic element 160 may be housed in the convex cylinder 153 of the guiding seat 150. The movable member 120 may be mounted into the guiding hole 151 of the guiding seat 150 from the middle of the first elastic element, and then the guiding seat 150 may be screwed into the positioning hole 112 of the base body 110 of the execution system. Therefore, the positioning boss 152 of the guiding seat 150 may be engaged and fastened with the positioning hole 112 of the base body 110 of the execution system, while ensuring that the upper surface of the movable member 120 and the convex surface at the left end of the lever 141 may be completely fitted together. The piezoelectric actuator may fully transmit the displacement of and force transmitted by the lever 142 to the movable member 120, so that the movable member 120 may be raised in height and the impact force thereof may be effectively regulated.

A flow channel assembly 200 of the fluid micro-injection device 300 according to an embodiment of the present disclosure will be specifically described below with reference to FIGS. 12-23.

Figure 12:
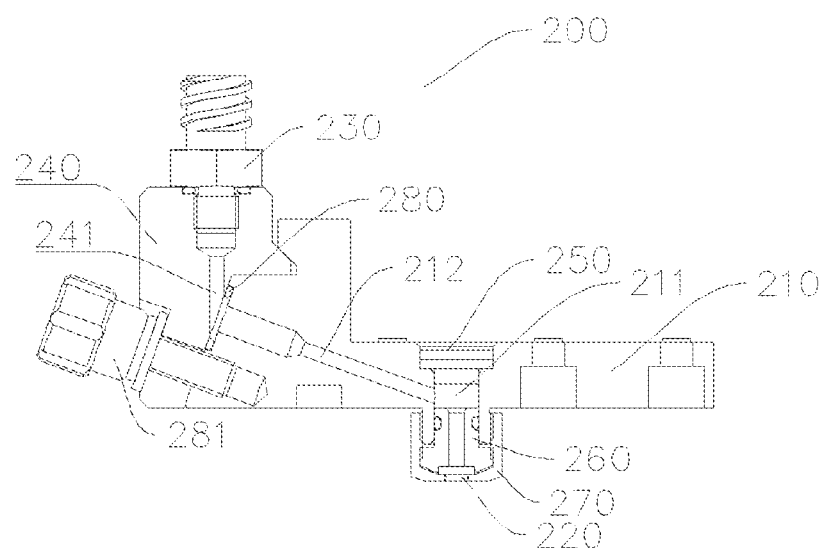
FIG. 12 is a schematic view showing a flow channel assembly of a fluid micro-injection device according to an embodiment of the present disclosure.
Figure 13:
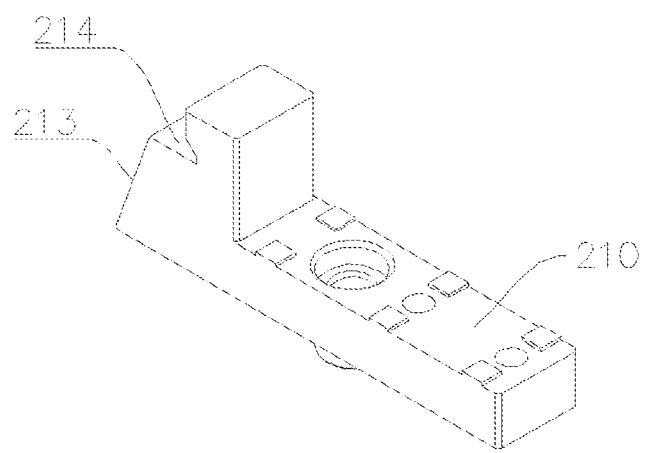
FIG. 13 is a schematic view showing a fluid seat of a flow channel assembly of a fluid micro-injection device according to an embodiment of the present disclosure.

Specifically, as shown in FIGS. 12-13, the flow channel assembly 200 may mainly comprise a fluid seat 210, a nozzle 220 disposed on the fluid seat 210, and a fluid chamber supply joint 230 connected with the fluid seat 210 to provide fluid to the fluid seat 210, as shown in FIGS. 1 and 2. The fluid seat 210 may be provided with a fluid chamber 211 and a flow channel 212. The flow channel 212 may be in communication with the fluid chamber 211. An outlet end of the fluid chamber 211 may be provided with the nozzle 220. The movable member may be movable along an axial direction of the nozzle 220 to open and close the nozzle 220. The fluid chamber supply joint 230 may be disposed on the fluid seat 210 communicating with flow channel 212. The fluid chamber supply joint 230 may be adapted to communicate with a fluid storage device to flow fluid through the flow channel 212 and the fluid chamber 211 to the nozzle.

According to the flow channel assembly 200 of the fluid micro-injection device according to an embodiment of the present disclosure, the fluid chamber 211 and the flow channel 212 may be defined in the fluid seat 210. Thus, the nozzle 220 on the fluid chamber 211 may be opened and closed by the movable member. The flow chamber supply joint 230 may communicate with the fluid chamber 211 through the flow channel 212. The flow channel assembly 200 may have a simple structure and be convenient for disassembly and cleaning with low maintenance cost.

According to an embodiment of the present disclosure, the flow channel assembly 200 may further include an adapter 240. The adapter 240 may define a flow guiding passage 241 therein. The adapter 240 may be connected to the fluid seat 210, and the flow guiding passage 241 may be connected to the flow channel 212. The fluid chamber supply joint 230 may be disposed on the adapter 240 and communicate with the flow guiding passage 241.

Specifically, as shown in FIG. 12, the fluid chamber supply joint 230 and the fluid seat 210 may be connected together and communicated to each other via the adapter 240 in the present embodiment. The fluid chamber supply joint 230 may be threadedly connected with the adapter 240 be in communication with the flow guiding passage 241.

According to an embodiment of the present disclosure, a seal ring 280 may be provided between the adapter 240 and the fluid chamber supply joint 230 and between the adapter 240 and the fluid seat 210 respectively. Further, the adapter 240 may be connected with the fluid seat 210 by a screw 281.

That is to say, the fluid chamber supply joint 230 and the adapter 240 may be directly connected by the threaded connection. The adapter 240 and the fluid seat 210 may be connected by the screw 281. A jointing portion of the adapter 240 and the fluid chamber supply joint 230 and a jointing portion of the adapter 240 and the fluid seat 210 may be a sealing ring 280, respectively. A fitting face of the adapter 240 and the fluid chamber supply joint 230 and a fitting face of the adapter 240 and the fluid seat 210 may be provided with a fitting groove suitable for placing the sealing ring 280, respectively. When the components may be matched with each other, the sealing ring 280 may be pressed tight for sealing purpose, thus ensuring overall sealing performance of the flow channel assembly 200. The structure assembly may be achieved by a thread or screw connection, so that assembly complexity can be greatly reduced, and assembly/disassembly and cleaning may be easily achieved whereas ensuring sealing performance.

The adapter 240 may be connected to the fluid seat 210 by a screw 281. After the screw 281 may be removed, the adapter 240 may be removed from the fluid seat 210, and one end of the flow channel 212 may be opened. Further, both the adapter 240 and the fluid chamber supply joint 230 may not have closed flow channel respectively. Accordingly, all parts of the entire flow channel assembly 200 may not have the closed channel. And thus all components may be conveniently cleaned to reduce cleaning difficulty after disassembly.

According to an embodiment of the present disclosure, the fluid seat 210 may be provided with a first assembly ramp or slope 213 extending slantedly with respect to the horizontal direction. The adapter 240 may be provided with a second assembly ramp 242 that may fit or match with the first assembly ramp 213. The screw 281 may pass through the adapter 240 and the fluid seat 210 to compress the first assembly ramp 213 and the second assembly ramp 241 tight.

According to an embodiment of the present disclosure, the first assembly ramp 213 may be provided with a positioning recess 214, and the second assembly ramp 242 may be provided with a positioning boss 243 corresponding to the positioning recess 214. The positioning boss 243 may be inserted into the positioning recess 214. Further, the opening of the positioning recess 214 may have an acute angle and a bottom surface of the positioning recess 214 may extend in the horizontal direction.

Figure 14:
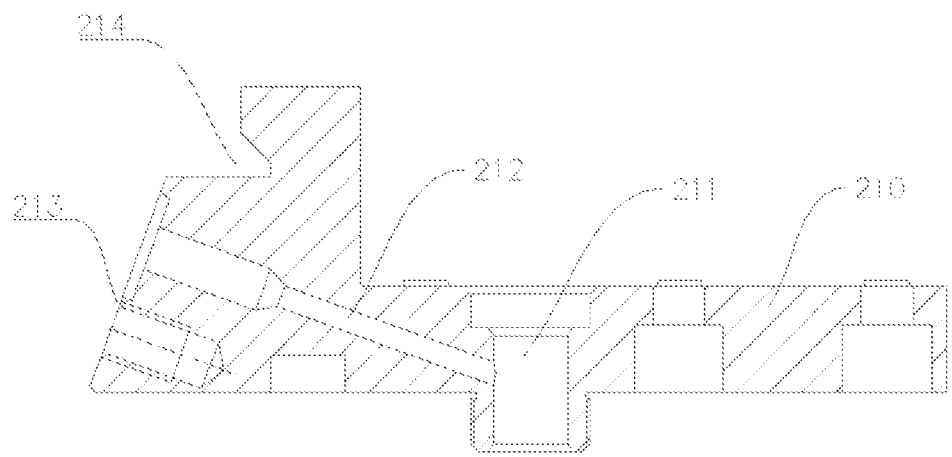
FIG. 14 is a cross-sectional view of a fluid seat of a flow channel assembly of a fluid micro-injection device according to an embodiment of the present disclosure.
Figure 15:
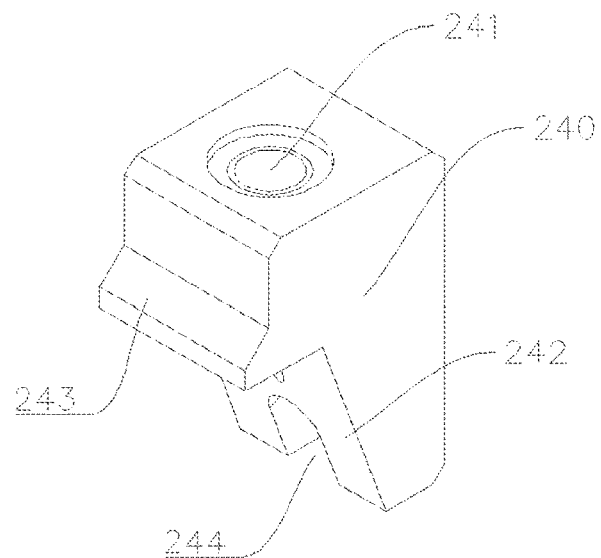
FIG. 15 is a schematic view showing an adapter of the flow channel assembly of a fluid micro-injection device according to an embodiment of the present disclosure.
Figure 16:
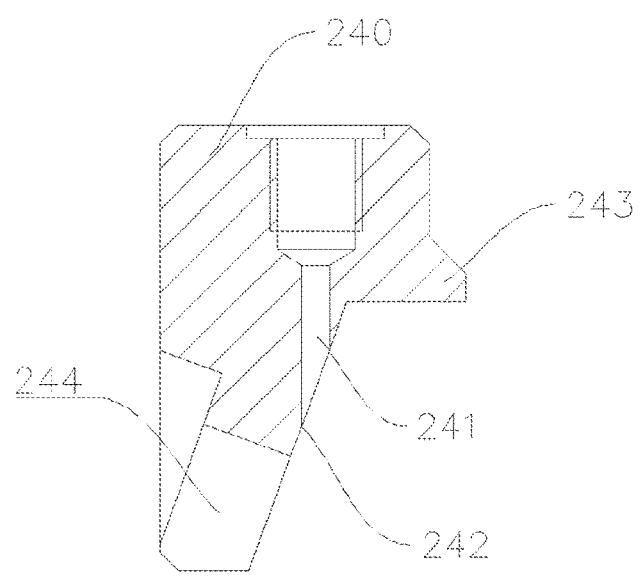
FIG. 16 is a cross-sectional view of an adapter of a flow channel assembly of a fluid micro-injection device according to an embodiment of the present disclosure.

Specifically, the fluid seat 210 and the adapter 240 may be respectively provided with the assembly ramps matching with each other, and the first assembly ramp 213 of the fluid seat 210 may be provided with a positioning recess 214, as shown in FIGS. 12, 14 and 16. The second assembly ramp 242 of the adapter 240 may be provided with the positioning boss 243. During assembly, the adapter 240 may fit with the assembly ramp of the fluid seat 210, and the adapter may be positioned by the matching of the positioning boss 243 and the positioning recess 214. The adapter 240 and the fluid seat 210 may be then fastened by screwing the adapter 240 and the fluid seat 210 via the screw 281, thus achieving the sealing connection of the adapter 240 with the fluid seat 210.

Therefore, when the adapter 240 and the fluid seat 210 may be locked tight, the positioning boss 243 and the positioning recess 214 may automatically guide and position the adapter 240 and the fluid seat 210, so that the mounting surfaces may be closely fitted. Accordingly, and inclination angles of the assembly ramp and the positioning recess 214 may cooperate with each other for matching, thus achieving accurate positioning and assembly.

According to an embodiment of the present disclosure, the flow channel 212 may extend slantedly with respect to the horizontal direction. The flow guiding passage 241 may extend along the vertical direction. A lower end of the flow channel 212 may communicate with the fluid chamber 211. An upper end of the flow channel 212 and the lower end of the flow guiding passage 241 may be communicated with each other.

As shown in FIG. 13, the flow channel 212 may be formed as a channel joining slantedly. An upper portion of the flow channel 212 may intersect with the flow guiding passage 241 of the adapter 240 and a lower portion of the flow channel 212 may penetrate and intersect with the fluid chamber 211 to achieve fluid delivery. The penetrating and intersecting flow channel 212 and the fluid chamber 211 may be easily cleaned. The flow guiding passage 241 may be formed in a way known in the art, the upper portion of the flow guiding passage 241 may be connected to the fluid supply joint 230 and sealed by pressing and deforming a sealing ring 280. The lower portion of the flow guiding passage may intersect with the upper end of the flow channel 212, and sealed through pressing the sealing ring 280 by pressing the adapter 240 and the fluid seat 210 tight, thereby achieving fluid delivery. Meanwhile, the vertical flow channel may be easy for cleaning.

In addition, the adapter 240 may also be provided with a U-shaped opening 244 adapted to be assembled with the screw 281. The screw 281 may be a quick-locking screw 281. For assembly convenience, the screw 281 may be provided with a flower-shaped cylinder to be convenient for an operator's manual operation. The screw 281 may be provided with an assembly platform adapted to fit with the U-shaped opening 244. When the adapter 240 may be installed, the quick-locking screw 281 may be first screwed into the mounting thread of the fluid seat 210. The U-shaped opening 244 of the adapter 240 may be then inserted between the screw 281 and the fluid seat 210, and the screw 281 may be locked to complete installation. During disassembly, the screw 281 may be firstly loosened, and then the adapter 240 may be directly removed in a slanting manner, thus the disassembly and assembly may be convenient.

According to an embodiment of the present disclosure, the flow channel assembly 200 may further comprise a fluid chamber seal 250 disposed in the fluid chamber 211 and located at an upper end of the fluid chamber 211 to close the upper end of the fluid chamber 211. The fluid chamber seal 250 may be provided with an inner hole 251 penetrating therethrough in an axial direction. The movable member may pass through the inner hole and then extend into the fluid chamber 211.

Figure 17:
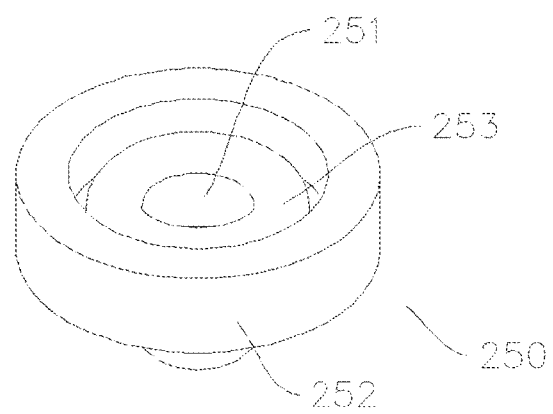
FIG. 17 is a schematic view showing a fluid chamber seal of a flow channel assembly of a fluid micro-injection device according to an embodiment of the present disclosure.
Figure 18:
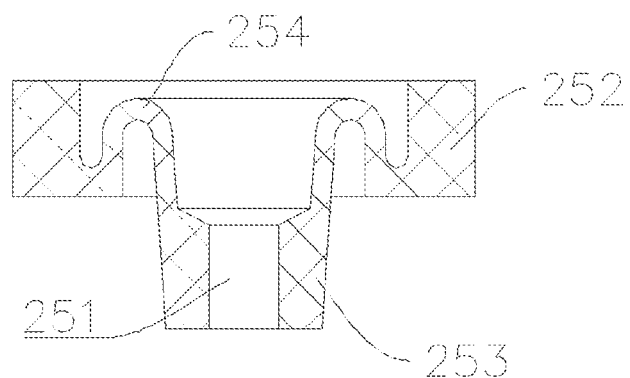
FIG. 18 is a cross-sectional view of a fluid chamber seal of a flow channel assembly of a fluid micro-injection device according to an embodiment of the present disclosure.

Specifically, the fluid chamber seal 250 may be further disposed at the upper end of the fluid chamber 211, as shown in FIGS. 12, 17 and 18. The fluid chamber seal 250 may seal the upper end of the fluid chamber 211, and the fluid chamber seal 250 may be provided with the inner hole 251, through which the movable member can be received. Accordingly, by providing the fluid chamber seal 250, the sealing performance of the fluid chamber 211 may be ensured whereas the movable member may be movably controlled.

Further, according to an embodiment of the present disclosure, the upper end of the fluid chamber 211 may be formed in a stepped shape. The fluid chamber seal 250 may include an outer cylinder 252 and an inner cylinder 253. A shape of the outer cylinder 252 may correspond to that of the upper end of the fluid chamber 211 to be fitted at the upper end of the fluid chamber 211. A radial dimension of the inner cylinder 253 may be smaller than a radial dimension of the outer cylinder 252. The inner cylinder 253 may be disposed in the outer cylinder 252 and elastically connected with the outer cylinder 252. The inner cylinder 253 may be provided with an inner hole 251 along the axial direction thereof. Preferably, the inner cylinder 253 and the outer cylinder 252 may be connected by a bending elbow member 254 in some embodiments of the disclosure.

That is to say, the fluid chamber seal 250 may be mainly comprise two parts, the inner cylinder 253 and the outer cylinder 252. The inner cylinder 253 may be coaxial with the outer cylinder 252. The inner cylinder 253 may be located at inner periphery of the outer cylinder 252. The inner hole 251 may be provided on the inner cylinder 253. The inner cylinder 253 and the outer cylinder 252 may cooperate with each other to form a substantially stepped shape, thus adapting to be fitted with an upper end of the fluid chamber 211.

Figure 7:
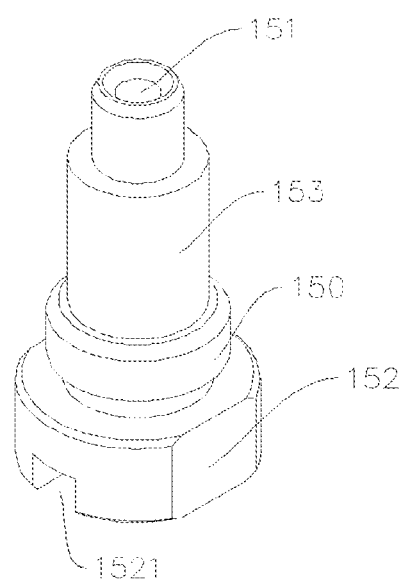
FIG. 7 is a schematic view showing a structure of a guiding seat of the execution system for the fluid micro-injection device according to an embodiment of the present disclosure.
Figure 8:
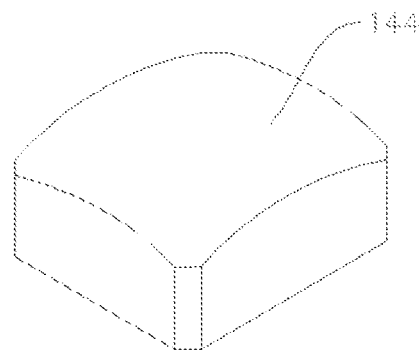
FIG. 8 is a schematic view showing a structure of an upper actuator top block of the execution system for a fluid micro-injection device according to an embodiment of the present disclosure.
Figure 9:
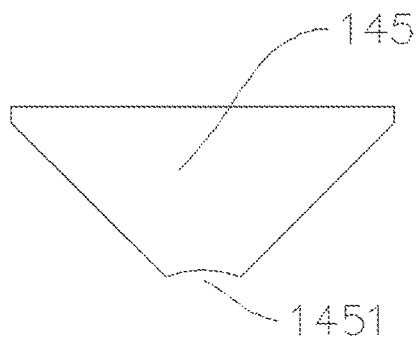
FIG. 9 is a schematic view showing a structure of a lower actuator top block of the execution system for the fluid micro-injection device according to an embodiment of the present disclosure.
Figure 10:
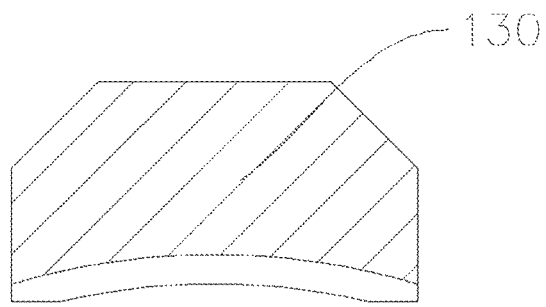
FIG. 10 is a schematic view showing a structure of an adjusting member of the execution system for the fluid micro-injection device according to an embodiment of the present disclosure.

The inner cylinder 253 and the outer cylinder 252 may be elastically connected or fixedly connected with each other, as long as the movable member may be movable whereas the sealing may be ensured. According to an embodiment of the present disclosure, the inner cylinder 253 and the outer cylinder 252 may be connected by the bending elbow member 254, which may be the bending structure as shown in FIG. 7. Accordingly, the sealing performance of the fluid chamber 211 may be ensured and the movable member may drive the inner cylinder 253 to move in an up and down direction, with a reasonable structure.

According to an embodiment of the present disclosure, the flow channel assembly 200 may further include a sealing seat 260 disposed on the fluid seat 210 between the fluid chamber seal 250 and the nozzle 220. The sealing seat 260 may be provided with a guiding passage 261 extending therethrough in the axial direction. The nozzle 220 may be connected with the seal seat 260 and communicate with the guiding passage 261. The movable member may pass through the guiding passage 261 and movable in the axial direction of the guiding passage 261 to open and close the nozzle 220. Further, a cross section of the guiding passage 261 may be formed as a flower-shaped cross section.

Figure 19:
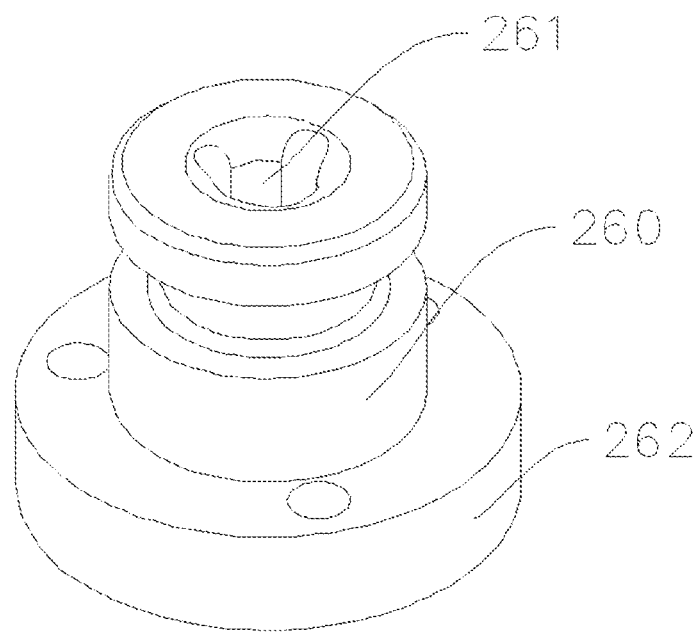
FIG. 19 is a schematic view showing a structure of a sealing seat of a flow channel assembly of a fluid micro-injection device according to an embodiment of the present disclosure.
Figure 20:
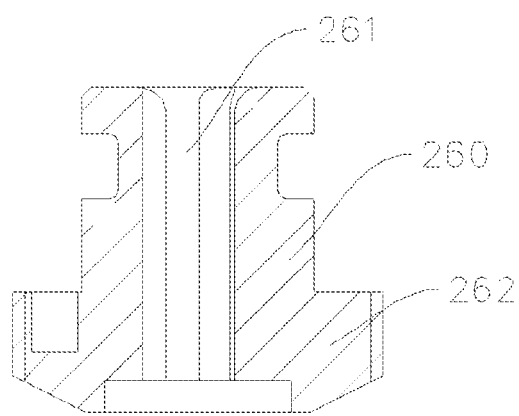
FIG. 20 is a cross-sectional view of the sealing seat of a flow channel assembly of a fluid micro-injection device according to an embodiment of the present disclosure.

Specifically, in this embodiment, the sealing seat 260 may be further disposed in the fluid chamber 211, and the guiding passage 261 may be disposed in the sealing seat 260, as shown in FIGS. 19 and 20. The guiding passage 261 may also achieve fluid delivery while the movable member may be accommodated in the guiding passage and pass therethrough. The cross section of the guiding passage 261 may be formed as a flower-shaped cross section. This means that the guiding passage 261 may comprise the guiding hole penetrating in the axial direction and flower-shaped notches formed on the outer periphery of the guiding hole. When the guiding hole may be engaged with the movable member, the flower-shaped notches on the outer circumference of the guiding hole can ensure that the fluid may reach the junction of the movable member and the nozzle 220, thereby achieving fluid delivery.

According to an embodiment of the present disclosure, a bottom of the sealing seat 260 may be provided with a positioning step 262. The nozzle 220 may be provided with a positioning protrusion 221 corresponding to the positioning step 262. The positioning protrusion 221 may be embedded within the positioning step 262. In view of the above, an interference fit between the nozzle 220 and the sealing seat 260 may be achieved by the matching of the positioning step 262 and the positioning protrusion 221. Accordingly, the sealing performance may be ensured whereas the axis of the nozzle 220 may be coaxial with the axis of the movable member at the same time.

According to an embodiment of the present disclosure, the nozzle 220 may define an injection passage 222 penetrating therethrough. An upper end of the injection passage 222 may be formed as a tapered surface that fits with the lower end surface of the movable member.

Figure 21:
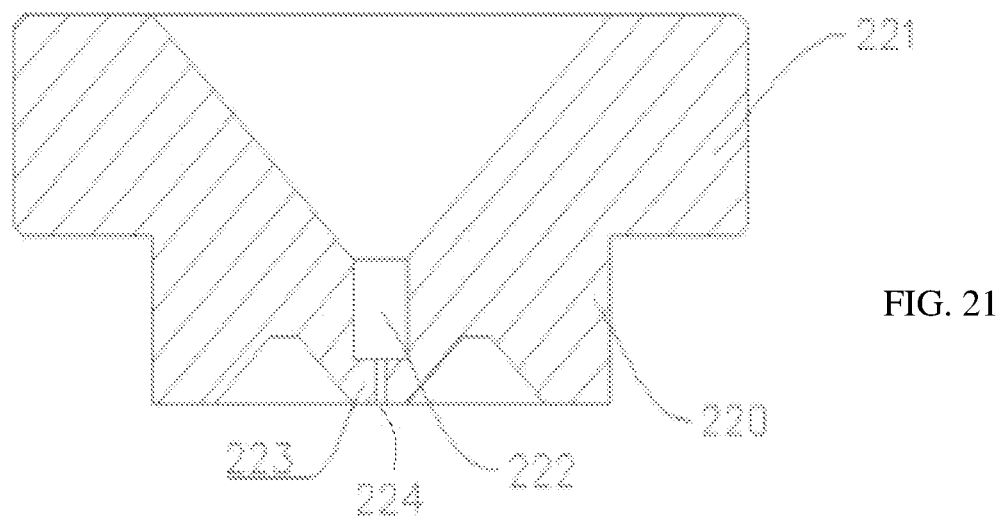
FIG. 21 is a cross-sectional view of a nozzle of a flow channel assembly of a fluid micro-injection device according to an embodiment of the present disclosure.

Specifically, the outer periphery of the upper end of the nozzle 220 may be provided with the positioning protrusion 221 that may fit or match with the sealing seat 260, as shown in FIG. 21. The center of the nozzle 220 may be provided with the injection passage 222 penetrating therethrough in the axial direction. An upper end of the injection passage 222 may be formed as a tapered surface. The lower end of the movable member may be formed as a ball head. When the ball head may abut against the tapered surface of the injection passage 222, the injection passage 222 may be closed accordingly. When the movable member may move upwardly and the ball head may thus be separated from the tapered surface of the injection passage 222, the fluid may be ejected from the injection passage 222. The injection effect of the nozzle 220 for injecting the fluid may be controlled by controlling a distance of the movable member from the injection passage 222.

According to an embodiment of the present disclosure, the lower end of the injection passage 222 may be provided with micro-holes 224. The micro-holes 224 may be coaxial with the nozzle 220. Dimensions of the micro-holes 224 may be selected according to different injection operating requirements so as to achieve a desired injection effect.

Further, the lower end of the nozzle 220 may be provided with a tapered boss 223 and the micro-holes 224 may be provided in the tapered boss 223 according to an embodiment of the present disclosure. Therefore, rigidity of an outlet of the nozzle 220 may be increased by providing the tapered boss 223 at the outlet of the nozzle 220, thus preventing the end of the nozzle 220 from being damaged in maintenance while reducing fluid congestion at the outlet position, improving fluid coating quality.

According to an embodiment of the present disclosure, the flow channel assembly 200 may further include a threaded sleeve 270. The nozzle 220 and the sealing seat 260 may be mounted on the fluid seat 210 by the threaded sleeve 270.

Figure 22:
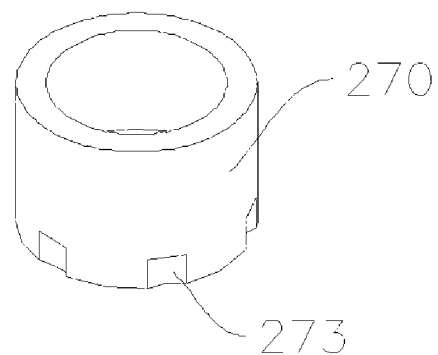
FIG. 22 is a schematic view showing a structure of a threaded sleeve of a flow channel assembly of a fluid micro-injection device according to an embodiment of the present disclosure.
Figure 23:
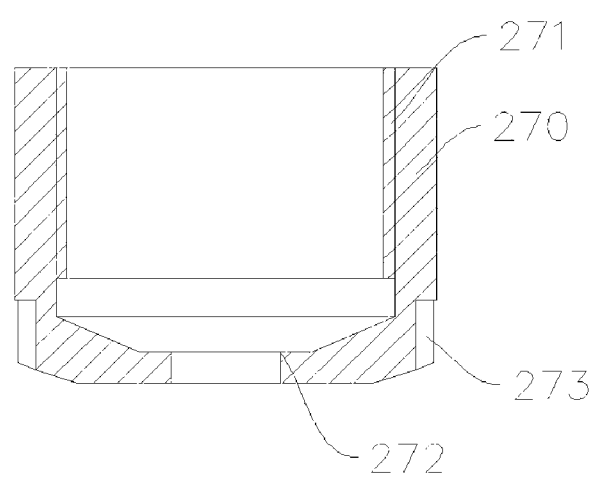
FIG. 23 is a cross-sectional view of a threaded sleeve of the flow channel assembly of a fluid micro-injection device according to an embodiment of the present disclosure.

According to an embodiment of the present disclosure, the threaded sleeve 270 may have an internal thread 271 that may match with the locking thread of the sealing seat 260 to fix the nozzle 220 between the sealing seat 260 and the threaded sleeve 270 when tightened, as shown in FIGS. 22 and 23. The threaded sleeve 270 may be provided with an inner mounting plane 272, which may be perpendicular to an internal thread axis. When the threaded sleeve may be tightened with the sealing seat 260, the inner mounting plane 272 may fit with a lower plane of the nozzle 220 so that the upper surface of the nozzle 220 may be closely fitted to a bottom surface of a round mounting recess of the sealing seat 260, thus achieving a sealing effect.

The lower end of the outer periphery of the threaded sleeve 270 may be provided with the flower-shaped notches 273. The flower-shaped notches 273 may conveniently adjust a position between the nozzle 220 and the movable member by using a matching tool so that the execution system may reach an optimal state for the fluid injecting operation. The flower-shaped notches 273 may be evenly spaced circumferentially, and the notch number may be equal to or greater than two and may be even.

The assembly process and assembly features of the flow channel assembly 200 of the fluid micro-injection device according to an embodiment of the present disclosure may be specifically described below.

Firstly, the sealing ring 280 may be mounted into the upper round recess of the adapter 240. The fluid supply system joint 230 may be then tightened to the adapter 240 to achieve flow channel sealing. Next, the sealing ring 280 may be mounted into the round recess of the inclined surface of the fluid seat 210. The adapter 240 may be connected and locked with the fluid seat 210 by the quick-locking screw 281 in combination with a spring washer and a flat washer to achieve the flow channel sealing. The fluid chamber seal 250 may be then pressed into the stepped fluid chamber 211 of the fluid seat 210 to pre-seal the upper portion of the fluid chamber 211. Finally, the fluid seat seal 250, the nozzle 220 and the seal seat 260 may be assembled together, and the seal seat 260 may be mounted in the threaded sleeve 270. The threaded sleeve 270 may be then threaded into the locking thread of the fluid seat 210 to seal the fluid chamber 211.

The assembly features of components of the flow channel assembly 200 of the fluid micro-injection device may be described as follows:

When the adapter 240 may be assembled with the fluid seat 210, the positioning boss of the adapter 240 may need to be inserted into the positioning recess of the fluid seat 210. The quick-locking screw 281 may be then tightened so that the assembly ramp of the adapter 240 may automatically fit with the assembly ramp of the fluid seat 210, thus achieving sealing effect of the flow channel.

The seal 280 may be inserted into the sealing recess of the sealing seat 260. The nozzle 220 may be then mounted into the round mounting recess of the sealing seat 260, screwed into the threaded sleeve 270 and securely screwed to tighten the nozzle 220. The threaded sleeve 270 may then be screwed into the locking thread of the fluid seat 210 so that the inner tapered surface of the nozzle 220 may be in close contact with the ball head of the movable member. Meanwhile, the fluid seat seal 250 may closely fit with the inner wall of the fluid chamber 211 of the fluid seat 210, thus sealing the fluid chamber 211.

A control system of the fluid micro-injection device 300 according to an embodiment of the present disclosure will be specifically described below with reference to FIG. 24.

Figure 24:
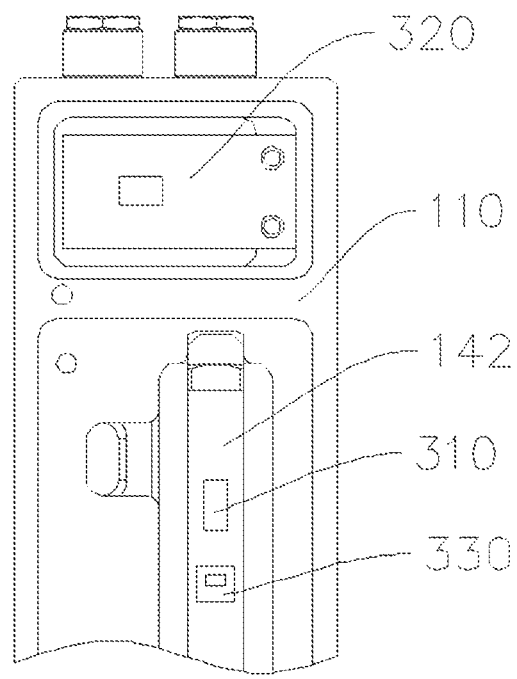
FIG. 24 is a partial schematic view of a fluid micro-injection device according to an embodiment of the present disclosure.

As shown in FIG. 24, the base boy 110 may define an executor mounting cavity therein and be provided with a positioning hole communicating with the executor mounting cavity. The actuator 142 may be telescopically mounted in the executor mounting cavity. The movable element may be movably disposed in the positioning hole. The movable element may be connected with the actuator 142 and driven by the actuator 142. The fluid seat 210 may be defined with a fluid chamber. A nozzle may be disposed on the fluid seat 210 and communicate with the fluid chamber. The movable element may movably pass through the fluid chamber to open and close the nozzle. A displacement sensor 310 may be used to detect a displacement value of the actuator 142 or movable element. A controller 320 may be connected with the actuator 142 and the displacement sensor 310 to receive information from the displacement sensor 310 and control operation of the actuator 142 accordingly.

In other words, the injection device 300 according to the embodiment of the present disclosure may mainly comprise two parts, the base body 110 and the fluid seat 210. The actuator 142 may be movably disposed in the base body 110. The nozzle may be disposed on the fluid seat 210. The movable component may be disposed on the base body 110 and attached to the actuator 142, and pass through the fluid seat 210 to fit with the nozzle. The actuator 142 may be telescopically drive the movable element to move, thereby controlling opening and closing of the nozzle. The displacement sensor 310 may be disposed on the base body 110 or the fluid seat 210 to detect the displacement of the actuator 142 or the movable element. The controller 320 may be connected with the displacement sensor 310 to receive a detection value of the displacement sensor 310. Meanwhile, the controller 320 may be connected with the actuator 142 and control expansion and contraction or drawback of the actuator 142 based on the detection value of the displacement sensor 310.

Concerning the above, according to the fluid micro-injection device of the embodiment of the present disclosure, the displacement sensor 310 may detect the displacement value of the actuator 142 or the movable element in real time by providing the displacement sensor 310 when the fluid micro-injection device may be used. Further, the controller 320 may determine whether the displacement value and a required displacement value may be deviated. A deviation can be automatically adjusted if there does have the deviation. Accordingly, a lifting height of the actuator 142 or the movable element may reach the requirement so that the fluid micro-injection device may be controllable and convenient for use.

According to an embodiment of the present disclosure, the displacement sensor 310 may be a strain gauge sensor or a capacitive displacement sensor 310. According to an embodiment of the present disclosure, the displacement sensor 310 may be attached or stuck on the actuator 142.

That is to say, the displacement sensor 310 may be a strain gauge displacement sensor that may be attached to or stuck on the piezoelectric actuator 142. The displacement sensor may detect an extending amount of the piezoelectric actuator 142 in real time. The controller 320 may adjust the extending amount in real time based on the detection value, thus achieving high quality injection.

Alternatively, the fluid micro-injection device 300 may further include a temperature sensor 330 connected to the controller 320 in some embodiments of the present disclosure. The temperature sensor 330 may detect temperature of the actuator 142 and control operation of the actuator 142 based on the temperature.

Specifically, a real-time temperature of the piezoelectric actuator 142 may be collected by the temperature sensor 330 and transmitted to the controller 320. The controller 320 may evaluate the temperature. The controller 320 will stop the piezoelectric actuator 142 from operation and send an alarm to protect the piezoelectric actuator 142 when the temperature value may be higher than a highest temperature value of the piezoelectric actuator 142. Thus, the controllability and safety of the fluid micro-injection device 300 may be further improved accordingly.

According to an embodiment of the present disclosure, the temperature sensor 330 may be a contact temperature sensor or a non-contact temperature sensor. Further in an alternative embodiment, the temperature sensor 330 may be stuck to the actuator 142.

Specifically, the temperature sensor 330 may be stuck to the piezoelectric actuator 142 to monitor the temperature of the piezoelectric actuator 142 in real time. The controller 320 may stop operation of the execution system and send an alarm to protect the piezoelectric actuator 142 when the temperature of the piezoelectric actuator 142 may be higher than the set temperature.

In some embodiments of the present disclosure, the controller 320 may include a storage element that may record usage of the actuator 142, moving element or nozzle. The use time may be compared with a predetermined use time, and an alarm may be sent when the use time of the actuator 142, moving element or nozzle may reach the predetermined use times.

Specifically, when the control system may be connected with electronic control components and powered on, the control system may read the use time of the piezoelectric actuator 142, the movable element, and the nozzle in the fluid micro-injection system from a storage element of the controller 320. The control system may compare the use time to a set value. The control system may send an alarm to remind the user to perform maintenance and replacement, when it may determine that the set value has been reached. However, the fluid micro-injection system may still work normally. The control system may periodically record the use time of the piezoelectric actuator 142, the movable element and the nozzle in the storage element of the controller 320 during operation, so that the control system may promptly remind the user to maintain and replace the component after the use time may be reached, to ensure high fluid injection quality.

The controller 320 may include a circuit board according to an embodiment of the present disclosure. The base body 110 may be provided with a circuit board mounting cavity adapted to mount the circuit board. Alternatively, the circuit board may be plugged or snap-fitted on the base body 110.

That is to say, the controller 320 may further include a circuit board structure that is installed into a mounting area of an upper portion of the base body 110 of the execution system in the present embodiment. The circuit board may be mounted in the upper installation area of the base body 110 of the execution system by using screws during assembly. Meanwhile, the upper portion of the base body 110 of the execution system may be closed by a protective cover to protect the control board. The displacement sensor 310, the temperature sensor 330 and the piezoelectric actuator 142 may be attached together by using glue or other bondable material to ensure firm bonding.

According to an embodiment of the present disclosure, the circuit board may also be installed by plugging, or may be installed by a snap mounting means to ensure a firm installation. In addition, the displacement sensor 310 may be a capacitive displacement sensor besides the strain gauge sensor. Further, the displacement sensor may be required to be mounted on the upper surface of the front end of the lever and the base body 110 of the execution system to detect the actual displacement of the movable element in real time. Alternatively, the displacement sensor may also use other kinds of sensor. The temperature sensor 330 can employ a contact temperature measurement or a non-contact temperature measurement means except that the temperature sensor is attached on or stuck to the outer surface of the piezoelectric actuator 142 to directly detect the temperature. The temperature measurement component may be installed in the base body 110 of the execution system to detect surface temperature of the piezoelectric actuator by contact or non-contact temperature measurement.

According to the embodiment of the present disclosure, the fluid micro-injection device 300 may cooperate with other control systems. The control system may include a task management module, a control module, a processing module, an acquisition module and a communication module. After the control system is connected to the fluid micro-injection device 300 and energized, the acquisition module may firstly read relevant information in the electronic control components of the fluid micro-injection. The information may then be processed by the processing module. A ready signal is sent to the task management module, when it may be determined that the relevant component may have reached the use time or not. A warning message may be sent to the task management module if a component may reach the use time. After that, the task management module may perform corresponding processing. After all modules and devices may be ready, the task management module may issue relevant operation tasks to the processing module according to a preset operation setting. The processing module may complete the relevant processing and send related operation information to the control module. The control module may control the fluid micro-injection device to work independently or with external equipment. The acquisition module may collect information such as temperature and displacement in real time and provide the information to the processing module for processing during operation of the fluid micro-injection device. When the processing module may determine that parameters such as temperature or displacement may exceed a predetermined range, the processing module may send an alarm information to the task management module. The task management module may then perform corresponding processing according to problem levels.

An external device may provide related device information through the communication module when the communication module may be connected to the external device. The task management module may send a completion signal to the external device through the communication module when an operation task may end. The external device may then perform subsequent operations.

In addition, the fluid micro-injection device 300 according to the embodiment of the present disclosure may also cooperate with other devices. For example, the fluid micro-injection device may be used in conjunction with a visual recognition system or a programming system to perform related injection operations of fluid. And the fluid micro-injection device may cooperate with a motion robot, such as SCARA robot, Delta robot, Multi-joint robots, etc., to perform fluid injection operation of workpieces. And further, the fluid micro-injection device may cooperate with a visual motion robot, such as SCARA robot, Delta robot, multi-joint robot, etc., to complete automatic identification of the workpieces and fluid injection operation.

The fluid micro-injection device 300 according to the embodiment of the present disclosure may also cooperate with a visual dispenser, such as a three-degree-of-freedom rectangular coordinate robot, to perform glue dispensing operation of the workpieces.

As components may become smaller and thinner, glues with various viscosities for component bonding may have become a preferred solution for manufacturers. However, the original dispensing method may no longer meet the technical requirements for existing operation. A precise coating method may be required to meet requirements for finer glue width and smaller glue points. The fluid micro-injection device may be used to replace the dispensing device in the visual dispenser to meet requirement for higher precision.

The control system of the fluid micro-injection device may be required to be connected with the visual dispenser when the fluid micro-injection device may be placed on the platform of the visual dispenser. The visual dispenser may provide corresponding operation parameters to the task management module by the communication module of the control system. The vision system of the visual dispenser may automatically identify feature points or working points of the workpieces that need to be operated. The vision system issues corresponding operating parameters based on a set relevant process data, and the motion platform of the visual dispenser may simultaneously drive the fluid micro-injection device to move to arrive at the corresponding work point for the glue operation. An injection frequency of the fluid micro-injection device may match a motion speed of the motion platform of the visual dispenser to achieve best glue injection effect and optimal working efficiency.

A heat cooling system of the fluid micro-injection device 300 according to an embodiment of the present disclosure will be specifically described below with reference to FIGS. 25 to 28.

The fluid micro-injection device 300 according to an embodiment of the present disclosure may include the base body 110, the movable element, the actuator, a cover plate 340, a first joint 350 and a second joint 360.

Specifically, the base body 110 may be defined with the executor mounting cavity which may be open at a side. The base body 110 may be provided with the positioning hole communicating with the executor mounting cavity. The movable element may be movably disposed in the positioning hole. The executor may be movably disposed in the executor mounting cavity. The executor may be connected to the moving element to control movement of the movable element. A cover plate 340 may be disposed on the base body 110 to enclose the executor mounting cavity. The first joint 350 and the second joint 360 may communicate with the executor mounting cavity respectively to dissipate heat in the executor mounting cavity.

According to the fluid micro-injection device 300 of the embodiment of the present disclosure, the base body 110 may be defined with the executor mounting cavity in which the movable element, the executor and the like may be mounted. The base body 110 may be provided with the first joint 350 and the second joint 360 communicating with the executor mounting cavity. The executor mounting cavity may be inflated or inhaled by the first joint 350 and the second joint 360 while the heat may be exhausted from the executor mounting cavity.

According to the fluid micro-injection device 300 of the embodiment of the present disclosure, the first joint 350 and the second joint 360 may effectively dissipate heat in the base body 110 by providing the first joint 350 and the second joint 360 on the base body 110. This may reduce safety risk of the equipment and prolong a service life of the device.

According to an embodiment of the present disclosure, the first joint 350 and the second joint 360 may be respectively disposed on the cover 340. In other embodiments of the present disclosure, the first joint 350 and the second joint 360 may be respectively disposed on the base body 110. According to an embodiment of the present disclosure, the first joint 350 and the second joint 360 may be respectively disposed at the top of the base body 110.

Figure 25:
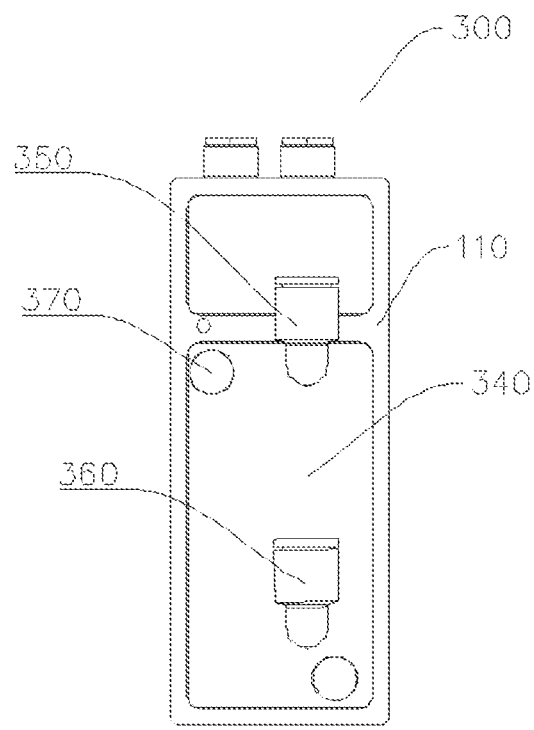
FIG. 25 is a schematic view of a fluid micro-injection device according to another embodiment of the present disclosure.
Figure 26:
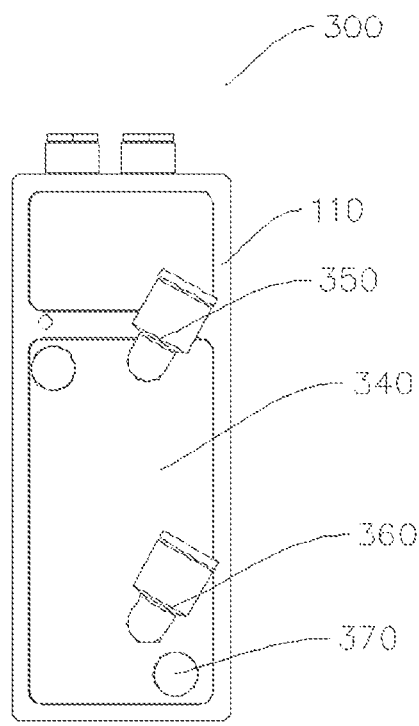
FIG. 26 is a schematic view of a fluid micro-injection device according to still another embodiment of the present disclosure.
Figure 27:
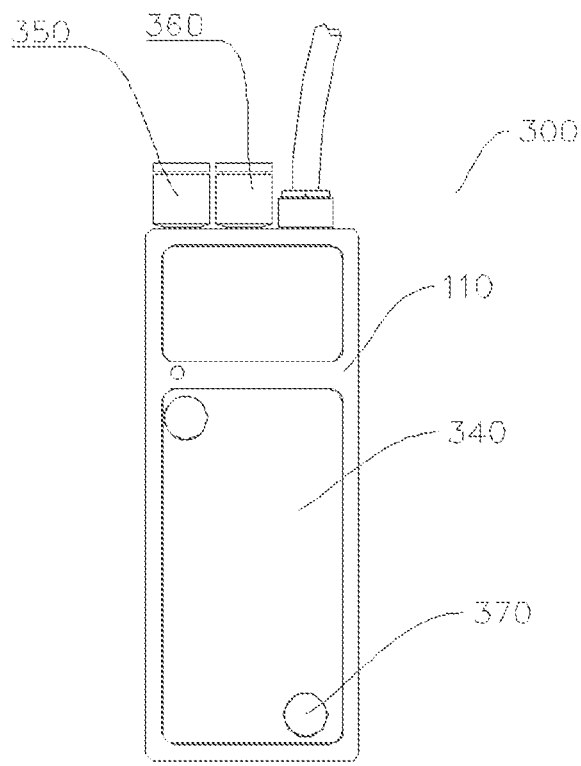
FIG. 27 is a schematic view of a fluid micro-injection device according to still another embodiment of the present disclosure.

Specifically, the first joint 350 and the second joint 360 may be respectively disposed on the cover plate 340 to communicate with the executor mounting cavity in the embodiment, as shown in FIGS. 25 and 26. The first joint 350 and the second joint 360 can be assembled by the structure shown in FIG. 1, or can be assembled according to the structure shown in FIG. 2. A specific assembly structure can be reasonably adjusted according to a structure of an accessory product. As shown in FIG. 27, the first joint 350 and the second joint 360 are respectively disposed on the base body 110 to communicate with the executor mounting cavity in the present embodiment.

The configuration of the first joint 350 and the second joint 360 may also be appropriately adjusted as needed. Alternatively, one of the first joint 350 and the second joint 360 may be a blowing joint and the other may be an air exhausting joint according to an embodiment of the present disclosure. In other embodiments of the present disclosure, one of the first joint 350 and the second joint 360 may be an air suction joint and the other may be an air intake joint. Therefore, heat in the executor mounting cavity may be dissipated through gas circulation by arranging one of the first joint 350 and the second joint 360 as an air intake joint and the other as an air suction joint.

In some embodiments of the present disclosure, the first joint 350 may be connected to a gas drying and purifying apparatus and the second joint 360 may be connected to a muffling apparatus. Therefore, the gas drying and purifying apparatus may dry and purify the cooling gas entering the execution system, thus preventing the cooling gas from containing moisture or other impurities and therefore, from damaging the piezoelectric actuator. The muffling apparatus may perform muffling to the exhausted gas from the execution system to prevent noise generated during gas discharge from affecting the operator for long time.

According to an embodiment of the present disclosure, the cover plate 340 may be provided with a mounting counterbore 341, which may be connected to the base body 110 by a countersunk screw. According to an embodiment of the present disclosure, the cover plate 340 may be provided with a protective groove 342 coaxial with the mounting counterbore 341. The fluid micro-injection device 300 may further include a protective gasket 370 disposed in the protective groove to cover the countersunk screw.

Figure 28:
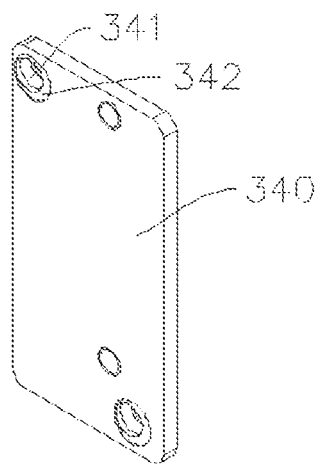
FIG. 28 is a schematic view of a cover plate of a fluid micro-injection device according to an embodiment of the present disclosure.

Specifically, the cover plate 340 may have a mounting surface that may fit with the base body 110 to seal the executor mounting cavity to prevent damage to the related devices, as shown in FIG. 28. The sealing cover 340 may be secured to the base body 110 of the actuator system by using countersunk screws. The protective groove 342 may be used to place the protective gasket in order to prevent looseness, thus preventing a non-maintenance person from disassembling the execution system and damaging the device accordingly.

The fluid micro-injection device 100 according to the embodiment of the present disclosure, an air pipe joint may be screwed into a threaded hole of the sealing cover 340 and fastened to prevent gas leakage during assembly. An external cooling gas may be injected into the gas drying and purifying apparatus and then passed into the lower air pipe joint. The cooling gas may be transmitted into the execution system. The exhausted gas may be transmitted into the muffling apparatus from the upper air pipe joint to reduce the exhausting noise. When the air pipe joint may be screwed into the threaded hole of the sealing cover 340, a raw material tape may be required to be wound around the threaded portion of the air pipe joint to effectively prevent gas leakage. The gas pipe connection may be required to be firmly inserted to prevent the problem of fake insertion and gas leakage.

In the description of the present specification, the description with reference to the terms "an embodiment", "some embodiments", "illustrative embodiment", "example", "specific example", or "some examples", etc. refer to particular features, structures, materials or characteristics described in the embodiments or examples included in at least an embodiment or example of the present disclosure. In the present specification, the schematic representation of the above terms does not necessarily mean the same embodiment or example. Furthermore, described particular features, structures, materials or characteristics may be combined in a suitable manner in any one or more embodiments or examples.

While the embodiments of the present disclosure have been shown and described, the embodiments of the present disclosure may be changed, varied and replaced for those skilled in the art without departing from the spirit and scope of the present disclosure, whereby the scope of the present disclosure is defined by the claims and their equivalents.

What is claimed is:

1. A fluid micro-injection device, comprising:
an execution system, including:
 a base body defining an executor mounting cavity therein, and the base body being provided with a positioning hole that communicates with the executor mounting cavity;
 a movable member movably disposed in the positioning hole;
 an executor movably disposed in the executor mounting cavity, the executor being connected with the movable member to control movement of the movable member;
 an adjusting member disposed in the executor mounting cavity and connected with the executor to adjust operating position of the executor;
 a plurality of clearance sheets disposed between an inner wall surface of the executor mounting cavity and the adjusting member to adjust a pre-tightening force of the executor; and
a flow channel assembly connected with the execution system, including:
 a fluid seat being defined with a fluid chamber and a flow channel in communication with the fluid chamber, the base body being disposed on the fluid seat;
 a nozzle disposed on the fluid seat and in communication with the fluid chamber, the movable member movably passing through the fluid chamber to open and close the nozzle; and
 a fluid supply joint communicating with the flow channel to provide fluid to the nozzle through the flow channel and the fluid chamber;
wherein the flow channel assembly further comprises:
a fluid chamber seal disposed in the fluid chamber and located at an upper end of the fluid chamber to close the upper end of the fluid chamber, the fluid chamber seal being provided with an inner hole extending therethrough in an axial direction thereof, and the movable member extending through the inner hole into the fluid chamber;
wherein the upper end of the fluid chamber is formed in a stepped shape, and the fluid chamber seal comprises:
 an outer cylinder having a shape corresponding to a shape of the upper end of the fluid chamber to be fitted at the upper end of the fluid chamber; and
 an inner cylinder having a radial dimension smaller than a radial dimension of the outer cylinder, the inner cylinder being disposed in the outer cylinder and elastically connected to the outer cylinder, the inner cylinder being provided with the inner hole that penetrates through the inner cylinder in an axial direction thereof.

2. The fluid micro-injection device according to claim 1, wherein the executor comprises:
a lever disposed in the executor mounting cavity with both ends thereof being movable, and a first end of the lever being connected with the movable member to control movement of the movable member;
an actuator telescopically disposed within the executor mounting cavity, the actuator being connected to a second end of the lever to control movement of the lever, wherein the adjusting member is connected with the actuator to adjust the operating position of the actuator, the clearance sheets being disposed between the inner wall surface of the executor mounting cavity and the adjusting member to adjust the pre-tensioning force of the actuator; and a controller connected with the actuator to control extension and draw back of the actuator; wherein the executor further comprises a swing pin shaft disposed within the executor mounting cavity, an axis of the swing pin shaft is perpendicular to an axis of the actuator which is offset from the axis of the actuator in a horizontal direction, and the second end of the lever is connected to the swing pin shaft to pivot about the swing pin shaft.

3. The fluid micro-injection device according to claim 2, wherein the swing pin shaft is formed in a column shape, and the base body is provided with a positioning groove adapted to mount the swing pin shaft, a lower surface at the second end of the lever is provided with a fitting concave surface that fits with the swing pin shaft, and the swing pin shaft is disposed between the positioning groove and the fitting concave surface.

4. The fluid micro-injection device according to claim 2, wherein the adjusting member is provided at an upper end of the actuator, an upper actuator top block is disposed between the adjusting member and the upper end of the actuator, a lower actuator top block is disposed between a lower end of the actuator and the second end of the lever, and the lower actuator top block abuts against the lower end of the actuator and the second end of the lever.

5. The fluid micro-injection device according to claim 4, wherein a lower surface of the adjusting member is formed as an upwardly concave curved surface, an upper surface of the upper actuator top block is formed as an upwardly projecting curved surface, and a radius of the upper surface of the upper actuator top block is smaller than that of the lower surface of the adjustment element;

wherein an upper surface of the second end of the lever is provided with a first protrusion, a cross section of which is formed into an arcuate shape, and a lower surface of the lower actuator top block is provided with a notch, a cross section of which is formed in an arcuate shape, and a radius of the first projection is smaller than a radius of the notch.

6. The fluid micro-injection device according to claim 2, wherein a lower surface of the first end of the lever is provided with a second protrusion, a cross section of which is formed in an arcuate shape and the second protrusion abuts against an upper end surface of the movable member.

7. The fluid micro-injection device according to claim 2, further comprising:

a guiding seat disposed in the positioning hole, wherein the guiding seat is provided with a guiding hole penetrating through in an axial direction thereof, and the movable member is movably disposed on the guiding seat along the axial direction of the guiding hole;

wherein the movable member comprises:

a cylindrical shaft movably disposed in the guiding hole along an axial direction thereof, and a lower end of the cylindrical shaft being formed as a ball head; and an upper end part disposed at an upper end of the cylindrical shaft, the upper end part having a size larger than a radius of the cylindrical shaft, and a first elastic element being disposed between the upper end part and the guiding seat.

8. The fluid micro-injection device according to claim 7, wherein the guiding seat comprises:

a positioning boss detachably disposed in the positioning hole; and an upper convex cylinder disposed at an upper portion of the positioning boss and disposed coaxially with the positioning boss, wherein a radial dimension of the upper convex cylinder is smaller than a radial dimension of the positioning boss, the guiding hole penetrates through the upper convex cylinder and the positioning boss, and the first elastic element is formed as a spring that sleeves on the upper convex cylinder with both ends abutting against the positioning boss and the upper end part respectively.

9. The fluid micro-injection device according to claim 7, wherein one end of the positioning hole communicating with the executor mounting cavity is provided with a positioning recess having a radius that is larger than that of the positioning hole, the execution system further includes:

a positioning seat disposed in the positioning recess, the guiding seat extending through the positioning seat in the axial direction; and a second elastic element disposed between the positioning seat and the first end of the lever.

10. The fluid micro-injection device according to claim 9, wherein the second elastic element is formed as a spring, and both ends of the second elastic element abut against an upper surface of the positioning seat and a lower surface of the first end of the lever respectively;

wherein an outer contour of the positioning seat is formed substantially with a square shape, an outer circumference of the upper surface of the positioning seat is provided with a plurality of projecting portions spaced apart circumferentially, and an inner surface of each projecting portion is formed with an arcuate face corresponding to a shape of the outer contour of the second elastic element.

11. The fluid micro-injection device according to claim 1, wherein the flow channel assembly further comprises:

an adapter being defining with a flow guiding passage, and the adapter is connected to the fluid seat and the flow guiding passage is communicated with the flow channel, and the fluid supply joint is disposed on the adapter and is communicated with the flow guiding passage.

12. The fluid micro-injection device according to claim 11, wherein the adapter and the fluid seat are connected by a screw.

13. The fluid micro-injection device according to claim 12, wherein the fluid seat is provided with a first assembly ramp extending slantedly with respect to a horizontal direction, and the adapter is provided with a second assembly ramp that fits with the first assembly ramp, the screw passes through the adapter and the fluid seat to compress the first assembly ramp and the second assembly ramp.

14. The fluid micro-injection device according to claim 13, wherein the first assembly ramp is provided with a positioning recess, and the second assembly ramp is provided with a positioning boss corresponding to the positioning recess, and the positioning boss is inserted into the positioning recess;

wherein an opening of the positioning recess is formed with an acute angle and a bottom surface of the positioning recess extends in the horizontal direction.

15. The fluid micro-injection device according to claim 11, wherein the flow channel extends slantedly with respect to a horizontal direction, the flow guiding passage extends in a vertical direction, a lower end of the flow channel communicates with the fluid chamber, and an upper end of the flow channel communicates with a lower end of the flow guiding passage.

16. The fluid micro-injection device according to claim 1, wherein the flow channel assembly further comprising:

a sealing seat disposed on the fluid seat between the fluid chamber seal and the nozzle, the sealing seat being provided with a guiding passage penetrating through the sealing seat in an axial direction thereof, the nozzle and the sealing seat are connected and in communication with the guiding passage, and the movable member passes through the guiding passage and is movable along the axial direction of the guiding passage to open and close the nozzle.

17. The fluid micro-injection device according to claim 16, wherein the guiding passage comprises a guiding hole penetrating in an axial direction thereof and notches formed on an outer periphery of the guiding hole;

wherein a bottom of the sealing seat is provided with a positioning step, the nozzle is provided with a positioning protrusion corresponding to the positioning step, and the positioning protrusion is embedded in the positioning step.

18. The fluid micro-injection device according to claim 1, wherein the nozzle defines an injection passage that penetrates along an up-down direction of the injection passage, and an upper end of the injection passage is formed with a tapered surface fitting with a lower end surface of the movable member;

wherein a lower end of the nozzle is provided with a tapered boss.

19. The fluid micro-injection device according to claim 16, wherein the flow channel assembly further comprises a threaded sleeve, wherein the nozzle and the sealing seat are mounted on the fluid seat by the threaded sleeve.

* * * * *